(12) United States Patent
Sohn et al.

(10) Patent No.: US 12,512,892 B2
(45) Date of Patent: Dec. 30, 2025

(54) METHOD FOR MOBILE BACKHAUL LINK SETUP AND MANAGEMENT

(71) Applicant: Electronics and Telecommunications Research Institute, Daejeon (KR)

(72) Inventors: Kyung Yeol Sohn, Daejeon (KR); Jung Sook Bae, Daejeon (KR); Heesoo Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 540 days.

(21) Appl. No.: 17/942,522

(22) Filed: Sep. 12, 2022

(65) Prior Publication Data
US 2023/0080611 A1   Mar. 16, 2023

(30) Foreign Application Priority Data

Sep. 13, 2021 (KR) .................. 10-2021-0121743

(51) Int. Cl.
*H04B 7/06* (2006.01)
*G01S 19/51* (2010.01)
(Continued)

(52) U.S. Cl.
CPC .......... *H04B 7/06952* (2023.05); *G01S 19/51* (2013.01); *H04B 17/318* (2015.01); *H04W 16/28* (2013.01); *H04W 24/10* (2013.01)

(58) Field of Classification Search
CPC ..... H04B 7/0695; H04B 17/318; G01S 19/51; H04W 16/28; H04W 24/10
(Continued)

(56) References Cited

U.S. PATENT DOCUMENTS

| 7,050,977 B1 | 5/2006 | Bennett |
| 10,122,424 B2 | 11/2018 | Tong et al. |

(Continued)

FOREIGN PATENT DOCUMENTS

| JP | 2012235334 A | 11/2012 |
| JP | 6829188 B2 | 2/2021 |

(Continued)

OTHER PUBLICATIONS

Jungsook Bae, Structure of UAV-based Emergency Mobile Communication Infrastructure, 2021 International Conference on Information and Communication Technology Convergence (ICTC), Oct. 20-22, 2021 (Year: 2021).*

*Primary Examiner* — Nicholas R Taylor
*Assistant Examiner* — Chong G Kim
(74) *Attorney, Agent, or Firm* — WILLIAM PARK AND ASSOCIATES LTD.

(57) ABSTRACT

A method for setting up a mobile backhaul link, performed by a hub in a mobile backhaul system, may comprise: calculating a separation distance between the hub and a mobile backhaul terminal using GPS position information; selecting a beam width and a beam search scheme of at least one beam to be used for setting up the mobile backhaul link according to the separation distance; transmitting ID(s) of the at least one beam to the mobile backhaul terminal through the at least one beam having the beam width according to the beam search scheme; receiving the ID(s) of the at least one beam and a measurement result of the at least one beam from the mobile backhaul terminal; and selecting a first beam having a largest signal strength according to the measurement result, wherein the first beam is used for setting up the mobile backhaul link.

8 Claims, 14 Drawing Sheets

(51) Int. Cl.
*H04B 17/318* (2015.01)
*H04W 16/28* (2009.01)
*H04W 24/10* (2009.01)

(58) Field of Classification Search
USPC .......................................................... 370/329
See application file for complete search history.

(56) References Cited

U.S. PATENT DOCUMENTS

| | | |
|---|---|---|
| 10,484,885 B2 | 11/2019 | Kim et al. |
| 2003/0091010 A1 | 5/2003 | Garahi et al. |
| 2004/0229652 A1 | 11/2004 | Goldberg et al. |
| 2016/0050614 A1 | 2/2016 | Son et al. |
| 2017/0029107 A1* | 2/2017 | Emami ................. G01S 13/582 |
| 2017/0048775 A1 | 2/2017 | Kim |
| 2017/0339575 A1 | 11/2017 | Kim et al. |
| 2018/0027555 A1 | 1/2018 | Kim et al. |
| 2019/0044608 A1* | 2/2019 | Sundaresan ........... H04W 92/02 |
| 2019/0222297 A1* | 7/2019 | Vos ....................... H04W 24/02 |
| 2019/0230569 A1* | 7/2019 | Kim ..................... H04W 36/302 |
| 2021/0014782 A1 | 1/2021 | Cui et al. |
| 2021/0168671 A1 | 6/2021 | Hong |
| 2021/0343154 A1* | 11/2021 | Faccin .................... G08G 5/21 |
| 2022/0020276 A1* | 1/2022 | Natiuk .................... G08G 5/57 |
| 2022/0150719 A1* | 5/2022 | Park ...................... H04W 16/28 |

FOREIGN PATENT DOCUMENTS

| | | |
|---|---|---|
| KR | 101719095 B1 | 3/2017 |
| KR | 101881166 B1 | 7/2018 |
| KR | 102140298 B1 | 7/2020 |

\* cited by examiner

METHOD FOR MOBILE BACKHAUL LINK SETUP AND MANAGEMENT

CROSS-REFERENCE TO RELATED APPLICATIONS

This application claims priority to Korean Patent Application No. 10-2021-0121743, filed on Sep. 13, 2021, with the Korean Intellectual Property Office (KIPO), the entire contents of which are hereby incorporated by reference.

BACKGROUND

1. Technical Field

The present disclosure relates to backhaul link setup and management, and more particularly, to a method for setting up an initial backhaul link in a mobile backhaul network, and managing the initial backhaul link.

2. Related Art

Recently, due to the rapid development of industrial technology and information and communication technology, active technology development is being carried out aiming at the base services such as enhanced mobile broadband (eMBB) service, ultra-reliable and low-latency communication (URLLC), and massive machine-type communication (mMTC). In particular, a small cell technology is attracting attention as a technology capable of coping with rapidly increasing mobile traffic, satisfying a quality of service (QoS) required by users of mobile communication services, and increasing a channel capacity per unit area of a base station.

Accordingly, a wireless backhaul technology that enables high-speed and high-reliability wideband transmission based on a millimeter wave (mmWave) band is being developed, and the wireless backhaul technology can be widely applied to a mobile wireless backhaul technology utilizing various moving objects such as cars, trains, and drones. In particular, the mmWave band-based mobile wireless backhaul technology using aerial vehicles such as drones can be widely applied to various fields such as transportation service, relay broadcasting, supply of emergency relief goods, safety accident monitoring, and pesticide spraying.

On the other hand, the mmWave band-based wireless backhaul technology may have a large path loss due to the characteristics of the mmWave frequency having a short wavelength, and thus there may be restrictions on long-distance communication. In addition, the above-mentioned restriction can be overcome by using a beamforming technology using a narrow beam, but a problem of increasing a time required for initial backhaul link setup may arise due to a narrow beam width.

Therefore, there is a need for a technique for efficiently setting up and managing a mobile backhaul link in consideration of radio wave environmental characteristics such as a high path loss and an atmospheric attenuation.

SUMMARY

In order to solve the above-identified problems, exemplary embodiments of the present disclosure are directed to providing a method for setting up and/or managing a mobile backhaul link.

A method for setting up a mobile backhaul link, performed by a hub in a mobile backhaul system, according to a first exemplary embodiment of the present disclosure for achieving the above-described objective, may comprise: calculating a separation distance between the hub and a mobile backhaul terminal using global positioning system (GPS) position information; selecting a beam width and a beam search scheme of at least one beam to be used for setting up the mobile backhaul link according to the separation distance; transmitting identifier(s) (ID(s)) of the at least one beam to the mobile backhaul terminal through the at least one beam having the beam width according to the beam search scheme; receiving the ID(s) of the at least one beam and a measurement result of the at least one beam from the mobile backhaul terminal; and selecting a first beam having a largest signal strength according to the measurement result, wherein the first beam is used for setting up the mobile backhaul link.

The method may further comprise: determining an initial azimuth angle and an initial elevation angle of the at least one beam by using the GPS position information, wherein the initial azimuth angle and the initial elevation angle are used to transmit the ID(s) of the at least one beam to the mobile backhaul terminal.

The method may further comprise: comparing a signal strength of the first beam with an upper threshold value and a lower threshold value; and in response to determining that the signal strength of the first beam is greater than or equal to the lower threshold and less than the upper threshold value, determining the first beam as a beam for setting up the mobile backhaul link.

The calculating of the separation distance between the hub and the mobile backhaul terminal may comprise: selecting a first beam area to which the mobile backhaul terminal belongs based on the separation distance from among at least one beam area divided based on a maximum distance between the hub and the mobile backhaul terminal.

The selecting of the beam width and the beam search scheme may comprise: selecting a beam width preconfigured in the first beam area and a beam search scheme preconfigured in the first beam area.

The selecting of the beam width and the beam search scheme may comprise: selecting a predetermined number of beams in the first beam area, wherein the ID(s) of the at least one beam are transmitted to the mobile backhaul terminal using the predetermined number of beams in the first beam area.

The method may further comprise: comparing a signal strength of the first beam with an upper threshold value and a lower threshold value; and in response to determining that the signal strength of the first beam is less than the lower threshold value or is equal to or greater than the upper threshold value, initializing the ID(s) of the at least one beam with the first beam as a center, and transmitting the initialized ID(s) of the at least one beam to the mobile backhaul terminal through the at least one beam.

In the comparing of the signal strength of the first beam with the upper threshold value and the lower threshold value, the signal strength of the first beam may be compared with an upper threshold value preconfigured in the first beam area and a lower threshold value preconfigured in the first beam area.

A method for managing a mobile backhaul link, performed by a hub in a mobile backhaul system, according to a first exemplary embodiment of the present disclosure for achieving the above-described objective, may comprise: calculating a first separation distance between the hub and a mobile backhaul terminal using first global positioning system (GPS) position information at a first time, and calculating a second separation distance between the hub and the mobile backhaul terminal using second GPS position information at a second time; determining whether a first beam area to which the mobile backhaul terminal belongs according to the first separation distance matches a second beam area to which the mobile backhaul terminal belongs according to the second separation distance; in response to determining that the first beam area matches the second beam area, comparing a strength of a signal received from the mobile backhaul terminal with a first lower threshold value; and in response to determining that the strength of the signal is less than the first lower threshold, determining whether a beam width of a first beam used for the mobile backhaul link matches a beam width determined for the first beam area.

The method may further comprise: in response to determining that the beam width of the first beam matches a beam width determined for a beam area to which the mobile backhaul terminal belongs, selecting a second beam having a largest signal strength by performing a beam search process of measuring signal strength(s) of at least one beam with the first beam as a center, wherein the second beam is used for managing the mobile backhaul link.

The method may further comprise: in response to determining that the beam width of the first beam does not match a beam width determined for a beam area to which the mobile backhaul terminal belongs, selecting the beam width of the first beam as a beam width matching a beam width determined for a beam area to which the mobile backhaul terminal belongs.

When the beam width of the first beam does not match a beam width determined for a beam area to which the mobile backhaul terminal belongs, the first lower threshold value may be changed to a second lower threshold value, and the second lower threshold value may be smaller than the first lower threshold value.

The method may further comprise: in response to determining that the first beam area does not match the second beam area, comparing a received signal strength of the first beam with the first lower threshold value; and in response to determining that the received signal strength is less than the first lower threshold value, changing the beam width of the first beam, wherein the beam width of the first beam after the change is narrower than the beam width of the first beam before the change.

The method may further comprise: selecting a second beam having a largest signal strength by performing a beam search process of measuring signal strength(s) of at least one beam with the first beam whose beam width has been changed as a center, wherein the second beam is used for managing the mobile backhaul link.

The method may further comprise: in response to determining that the received signal strength is equal to or greater than the first lower threshold value, comparing the received signal strength with a first upper threshold value; and in response to determining that the received signal strength is equal to or greater than the first upper threshold value, changing the beam width of the first beam, wherein the beam width of the first beam after the change is wider than the beam width of the first beam before the change.

When the received signal strength is equal to or greater than the first upper threshold value, the first upper threshold value may be changed to a second upper threshold value, and the second upper threshold value may be greater than the first upper threshold value.

The method may further comprise: in response to determining that the received signal strength is less than the first upper threshold value, receiving third GPS position information of the hub and the mobile backhaul terminal at a third time; and calculating a third separation distance between the hub and the mobile backhaul terminal using the third GPS position information.

According to the exemplary embodiments of the present disclosure, a time required for initial backhaul link setup of the mobile backhaul system can be reduced by setting up a backhaul link between a mobile backhaul hub and a mobile backhaul terminal using a different beam width and a different beam search scheme according to a separation distance between the mobile backhaul hub and the mobile backhaul terminal, which is obtained based on GPS position information of the mobile backhaul hub and the mobile backhaul terminal. In addition, according to the exemplary embodiments of the present disclosure, the backhaul link of the mobile backhaul system can be efficiently managed by determining whether there is a change in a beam area according to the separation distance, and managing the backhaul link based on a result of comparison between a strength of a signal received by the mobile backhaul hub and an upper threshold value and/or lower threshold value.

DETAILED DESCRIPTION OF THE EMBODIMENTS

Figure 1:
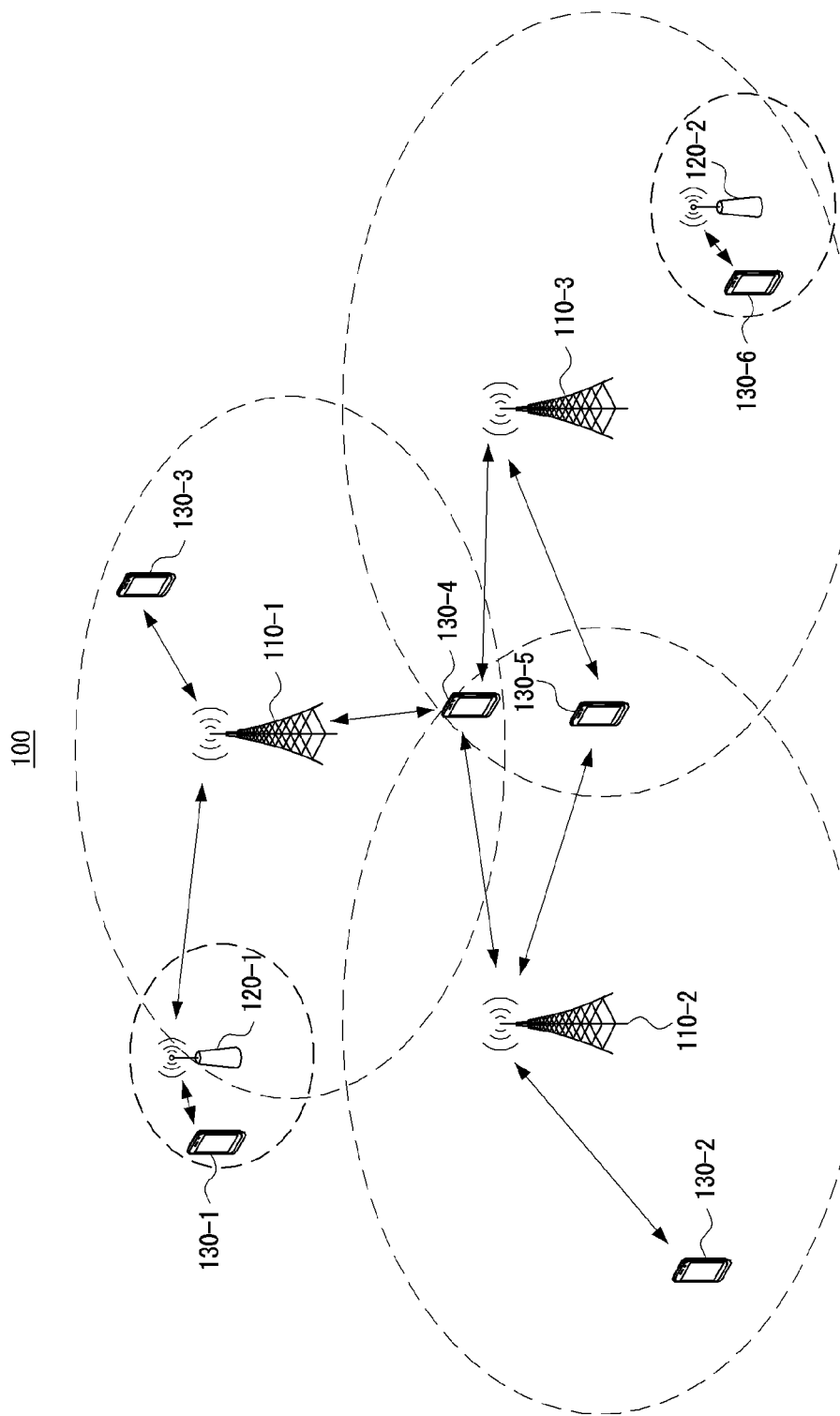
FIG. 1 is a conceptual diagram illustrating a first exemplary embodiment of a communication system.

Exemplary embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

In exemplary embodiments of the present disclosure, "at least one of A and B" may refer to "at least one of A or B" or "at least one of combinations of one or more of A and B". In addition, "one or more of A and B" may refer to "one or more of A or B" or "one or more of combinations of one or more of A and B".

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A communication system to which exemplary embodiments according to the present disclosure are applied will be described. The communication system to which the exemplary embodiments according to the present disclosure are applied is not limited to the contents described below, and the exemplary embodiments according to the present disclosure may be applied to various communication systems. Here, the communication system may be used in the same sense as a communication network.

Throughout the present disclosure, a network may include, for example, a wireless Internet such as wireless fidelity (WiFi), mobile Internet such as a wireless broadband Internet (WiBro) or a world interoperability for microwave access (WiMax), 2G mobile communication network such as a global system for mobile communication (GSM) or a code division multiple access (CDMA), 3G mobile communication network such as a wideband code division multiple access (WCDMA) or a CDMA2000, 3.5G mobile communication network such as a high speed downlink packet access (HSDPA) or a high speed uplink packet access (HSUPA), 4G mobile communication network such as a long term evolution (LTE) network or an LTE-Advanced network, 5G mobile communication network, beyond 5G (B5G) mobile communication network (e.g., 6G mobile communication network), or the like.

Throughout the present disclosure, a terminal may refer to a mobile station, mobile terminal, subscriber station, portable subscriber station, user equipment, access terminal, or the like, and may include all or a part of functions of the terminal, mobile station, mobile terminal, subscriber station, mobile subscriber station, user equipment, access terminal, or the like.

Here, a desktop computer, laptop computer, tablet PC, wireless phone, mobile phone, smart phone, smart watch, smart glass, e-book reader, portable multimedia player (PMP), portable game console, navigation device, digital camera, digital multimedia broadcasting (DMB) player, digital audio recorder, digital audio player, digital picture recorder, digital picture player, digital video recorder, digital video player, or the like having communication capability may be used as the terminal.

Throughout the present specification, the base station may refer to an access point, radio access station, node B (NB), evolved node B (eNB), base transceiver station, mobile multihop relay (MMR)-BS, or the like, and may include all or part of functions of the base station, access point, radio access station, NB, eNB, base transceiver station, MMR-BS, or the like.

With the development of information and communication technologies, various wireless communication technologies are being developed. As the representative wireless communication technologies, there may be long term evolution (LTE), new radio (NR), or the like defined as the 3rd generation partnership project (3GPP) specifications. The LTE may be one of 4th generation (4G) wireless communication technologies, and the NR may be one of 5th generation (5G) wireless communication technologies.

The 5G communication system (e.g., NR communication system) that can use a high frequency band (e.g., frequency band of 6 GHz or above) as well as a frequency band (e.g., frequency band of 6 GH or below) of the 4G communication system is being considered to process the soaring wireless data after commercialization of the 4G communication system (e.g., LTE communication system).

Due to the rapid development of industrial technology and information and communication technology, active technology development is being carried out to provide mobile communication services supporting enhanced mobile broadband (eMBB) service, ultra-reliable and low-latency communication (URLLC), and massive machine-type communication (mMTC) utilizing an ultra-wideband.

In the mobile communication system such as 5G or NR, it may be necessary to use a high frequency band such as a millimeter wave (mmWave) in order to satisfy the requirements of the communication system standards. In a high frequency band such as a millimeter wave, characteristics such as higher signal attenuation, high path loss, low diffraction, and strong straightness may appear than in a low frequency band. Accordingly, it may be necessary to deploy dense base stations in a communication environment to ensure smooth communications in such a high frequency band.

A small cell is a radio access base station with a low power output, and refers to a base station having an operating range of several tens to hundreds of meters (m) rather than an area of several kilometers (km). The above-described small cell technology is attracting attention as a technology capable of coping with rapidly increasing mobile traffic, satisfying QoS required by users of mobile communication services, and increasing channel capacity per unit area of a base station.

In addition, a wireless backhaul technology that forms a backhaul link between a hub and a terminal is attracting attention. In particular, a mmWave backhaul link based on the mmWave band can construct a mobile communication network capable of high-speed and high-reliability broadband transmission using radio waves with a wavelength of millimeters.

The above-described wireless backhaul technology has an advantage in that it can build a mobile wireless backhaul network using various moving objects, such as terminals, cars, subways, trains, and/or drones whose positions are not fixed. The above-described mobile wireless backhaul network may provide mobile communication services to terminals, cars, subways, and/or trains moving at a high speed using a Mobile Hotspot Network (MHN) technology. In particular, the mobile wireless backhaul technology using aerial vehicles such as drones can be widely used in various fields by utilizing the characteristics of the aerial vehicles.

For example, the mobile communication service that supports the mobile wireless backhaul technology using aerial vehicles can provide efficient and rapid transportation services such as courier service, and can provide relay broadcasting services using unmanned aerial vehicles. A disaster relief service that procures medical supplies or emergency relief supplies can be provided even in a disaster area that has not been restored, a safety management service can be provided for monitoring safety accidents at beaches or construction sites, and a control drone service can be provided for quickly spraying pesticides on an agricultural land having a large area.

The mobile wireless backhaul technology using aerial vehicles may not have many geographical restrictions, and may have low installation costs or low maintenance and repair costs. In addition, the above-described mobile wireless backhaul technology can quickly adapt to changes in the network environment by using mobility of the aerial vehicles. Accordingly, the mobile wireless backhaul technology using aerial vehicles may have high commercial use value, and it may be required to provide a dedicated backhaul link for supporting large-capacity applications.

On the other hand, such a millimeter wave may have a large path loss due to atmospheric attenuation due to the characteristics of Extremely High Frequency (EHF), and may be greatly affected by rainfall attenuation due to scattering of raindrops. Therefore, the wireless backhaul technology based on the millimeter wave band may have limitations on long-distance communication due to path loss and rainfall attenuation.

Therefore, a beamforming technology capable of arranging several antennas at regular intervals and changing amplitude and phase of a signal supplied to each antenna to form a beam in a specific direction and strongly transmit and receive signals in the above-mentioned direction may be used to overcome the above-mentioned limitations. The beamforming technology uses high level gain and/or broadband antennas to concentrate and transmit radio wave energy in a narrow beam width, thereby overcoming path loss due to atmospheric attenuation and increasing the propagation distance of radio waves.

Meanwhile, in the case of achieving a gain of 40 dBi (i.e., decibels relative to an isotropic antenna) or more at a reception antenna, a narrow beam width within 1 degree (°) may be used in beamforming of a transmission antenna. In this case, it may be necessary to accurately align the directions of a transmission beam and/or a reception beam in the transmission antenna and/or the reception antenna, it may be difficult to measure the transmission beam having a narrow beam width in the reception antenna, and a time required for initial backhaul link setup between the backhaul hub and the backhaul terminal may be increased.

Therefore, an efficient backhaul link setup and management technique for providing a long-distance high-speed backhaul link may be required in consideration of radio wave environment characteristics such as high path loss and atmospheric attenuation in the millimeter wave band proportional to a communication distance.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

FIG. 1 is a conceptual diagram illustrating a first exemplary embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. The plurality of communication nodes may support 4th generation (4G) communication (e.g., long term evolution (LTE), LTE-advanced (LTE-A)), 5th generation (5G) communication (e.g., new radio (NR)), or the like. The 4G communication may be performed in a frequency band of 6 gigahertz (GHz) or below, and the 5G communication may be performed in a frequency band of 6 GHz or above. Also, the 6G communication may be performed in a terahertz (THz) frequency band.

For example, for the 4G, 5G, and/or 6G communications, the plurality of communication nodes may support a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, a filtered OFDM based communication protocol, a cyclic prefix OFDM (CP-OFDM) based communication protocol, a discrete Fourier transform spread OFDM (DFT-s-OFDM) based communication protocol, an orthogonal frequency division multiple access (OFDMA) based communication protocol, a single carrier FDMA (SC-FDMA) based communication protocol, a non-orthogonal multiple access (NOMA) based communication protocol, a generalized frequency division multiplexing (GFDM) based communication protocol, a filter bank multi-carrier (FBMC) based communication protocol, a universal filtered multi-carrier (UFMC) based communication protocol, a space division multiple access (SDMA) based communication protocol, or the like.

Meanwhile, each of the plurality of communication nodes 110-1, 110-2, 110-3, 120-1, 120-2, 130-1, 130-2, 130-3, 130-4, 130-5, and 130-6 constituting the communication system 100 may have the following structure.

Figure 2:
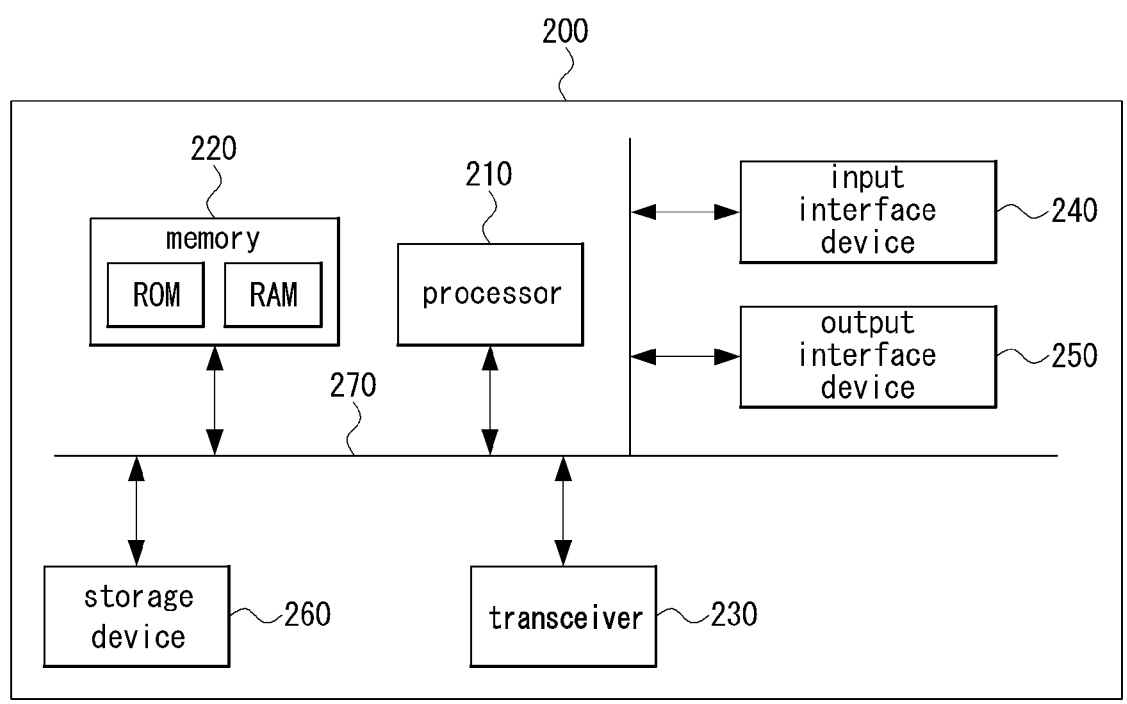
FIG. 2 is a block diagram illustrating a first exemplary embodiment of a communication node constituting a communication system.

FIG. 2 is a block diagram illustrating a first exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

However, each component included in the communication node 200 may be connected to the processor 210 via an individual interface or a separate bus, rather than the common bus 270. For example, the processor 210 may be connected to at least one of the memory 220, the transceiver 230, the input interface device 240, the output interface device 250, and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. The communication system 100 including the base stations 110-1, 110-2, 110-3, 120-1, and 120-2 and the terminals 130-1, 130-2, 130-3, 130-4, 130-5, and 130-6 may be referred to as an 'access network'. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may refer to a Node-B, a evolved Node-B (eNB), a base transceiver station (BTS), a radio base station, a radio transceiver, an access point, an access node, a road side unit (RSU), a radio remote head (RRH), a transmission point (TP), a transmission and reception point (TRP), an eNB, a gNB, or the like.

Here, each of the plurality of terminals 130-1, 130-2, 130-3, 130-4, 130-5, and 130-6 may refer to a user equipment (UE), a terminal, an access terminal, a mobile terminal, a station, a subscriber station, a mobile station, a portable subscriber station, a node, a device, an Internet of things (IoT) device, a mounted apparatus (e.g., a mounted module/device/terminal or an on-board device/terminal, etc.), or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul or a non-ideal backhaul, and exchange information with each other via the ideal or non-ideal backhaul. Also, each of the plurality of base stations 110-1, 110-2, 110-3, 120-1, and 120-2 may be connected to the core network through the ideal or non-ideal backhaul. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

Also, each of the plurality of base stations 110-1, 110-2, 110-3, 120-1, and 120-2 may support multi-input multi-output (MIMO) transmission (e.g., a single-user MIMO (SU-MIMO), multi-user MIMO (MU-MIMO), massive MIMO, or the like), coordinated multipoint (CoMP) transmission, carrier aggregation (CA) transmission, transmission in an unlicensed band, device-to-device (D2D) communications (or, proximity services (ProSe)), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2, and operations supported by the plurality of base stations 110-1, 110-2, 110-3, 120-1, and 120-2. For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

The first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Hereinafter, methods for initial backhaul link setup and management in a communication system will be described. Even when a method (e.g., transmission or reception of a signal) performed at a first communication node among communication nodes is described, the corresponding second communication node may perform a method (e.g., reception or transmission of the signal) corresponding to the method performed at the first communication node. That is, when an operation of a terminal is described, the corresponding base station may perform an operation corresponding to the operation of the terminal. Conversely, when an operation of the base station is described, the corresponding terminal may perform an operation corresponding to the operation of the base station.

Meanwhile, in the communication system, at least one base station 110-1, 110-2, and 110-3 may perform all functions of a communication protocol (e.g., remote radio transmission/reception function, baseband processing function, and the like). Alternatively, the remote radio transmission/reception function among all the functions of the communication protocol may be performed by a transmission reception point (TRP) (e.g., flexible (f)-TRP), and the baseband processing function among all the functions of the communication protocol may be performed by a baseband unit (BBU) block. The TRP may be a remote radio head (RRH), a radio unit (RU), or a transmission point (TP). The BBU block may include at least one BBU or at least one digital unit (DU). The BBU block may be referred to as a 'BBU pool', 'centralized BBU', or the like. The TRP may be connected to the BBU block through a wired fronthaul link or a wireless fronthaul link. A communication system composed of a backhaul link and a fronthaul link may be as follows. When a functional-split scheme of the communication protocol is applied, the TRP may selectively perform some functions of the BBU or some functions of medium access control (MAC)/radio link control (RLC) layers.

Figure 3:
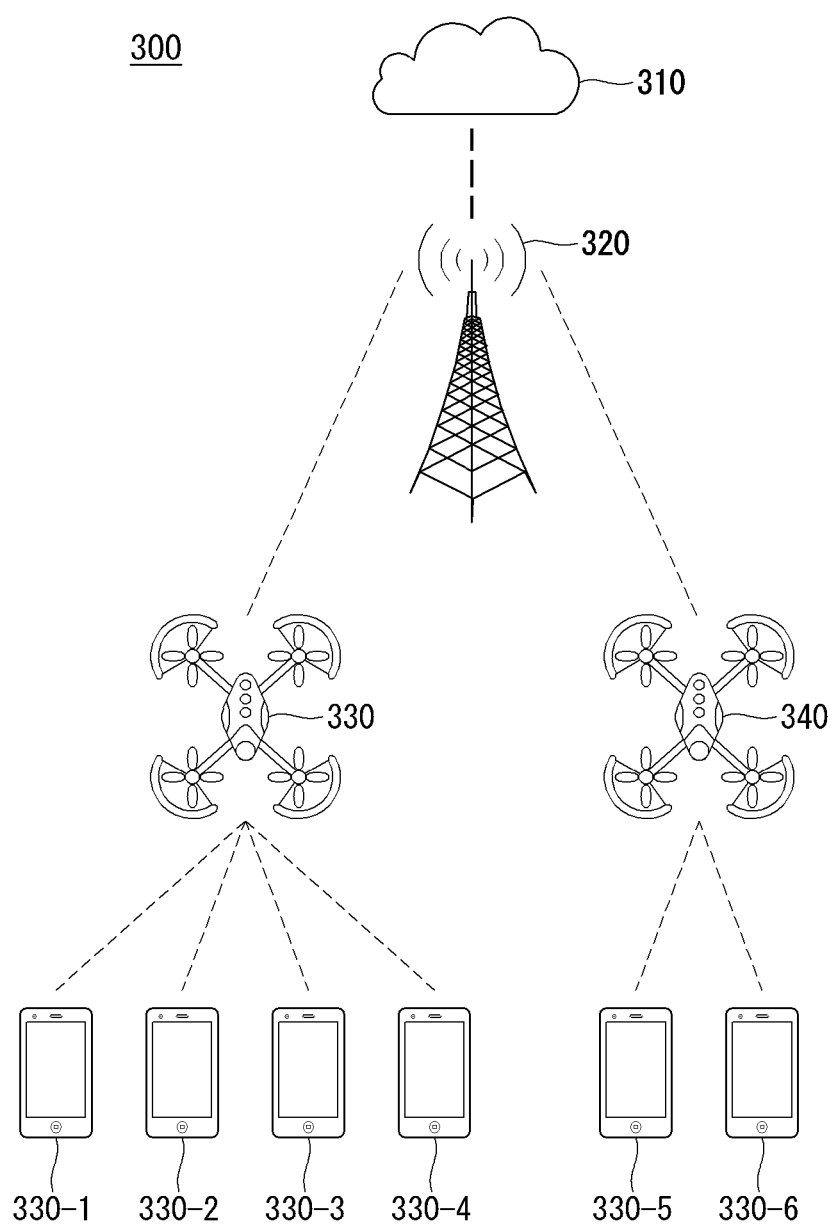
FIG. 3 is a conceptual diagram illustrating a first exemplary embodiment of a communication system including a mobile backhaul network.

FIG. 3 is a conceptual diagram illustrating a first exemplary embodiment of a communication system including a mobile backhaul network.

Referring to FIG. 3, a communication system 300 including a mobile backhaul network may comprise a core network 310, a mobile backhaul hub 320, at least one aerial vehicle 330 and 340, and/or at least one terminal 330-1, 330-2, 330-3, 330-4, 330-5, and 330-6.

The core network 310 may be the same as or similar to the core network described with reference to FIG. 1. When the communication system 300 supports 4G communication, the core network 310 may include a mobility management entity (MME), a serving gateway (S-GW), a packet data network gateway (P-GW), and the like. When the communication system 300 supports 5G communication, the core network 310 may include an AMF, a UPF, a P-GW, and the like.

The mobile backhaul hub 320 may be connected to the core network 310 and may be connected to a mobile backhaul terminal mounted on the aerial vehicle 330 or 340. The mobile backhaul hub 320 may be used to aggregate backhaul traffic of the mobile backhaul terminals mounted on the aerial vehicles 330 and 340. The mobile backhaul hub 320 may allow the mobile backhaul terminals mounted on the aerial vehicles 330 and 340 to communicate with the core network 310. A transceiver of the mobile backhaul hub 320 may form a beam electronically, and may adjust or change a direction of the beam. The mobile backhaul hub 320 may include at least one array antenna for forming a beam toward the at least one aerial vehicle 330 and 340 to perform communication. The mobile backhaul hub may use various schemes for beamforming (e.g., massive multiple input multiple output (MIMO), full dimensional MIMO (FD-MIMO), array antenna, analog beamforming, and a large-scale antenna, or the like).

Each of the at least one aerial vehicle 330 and 340 may be equipped with a mobile backhaul terminal and/or a mobile backhaul base station. The mobile backhaul terminal may communicate with the mobile backhaul hub 310 by forming a backhaul link with the mobile backhaul hub 310, and the mobile backhaul base station may provide mobile communication services to the at least one terminal 340-1, 340-2, 340-3, 340-4, 340-5, and 340-6 by establishing an access link with each of the at least one terminal 340-1, 340-2, 340-3, 340-4, 340-5, and 340-6. A transceiver of each of the at least one aerial vehicle 330 and 340 may form a beam electronically, and may adjust or change a direction of the beam. Each of the at least one aerial vehicle 330 and 340 may include at least one array antenna for forming a beam toward the mobile backhaul hub 320 and/or the at least one terminal 340-1, 340-2, 340-3, 340-4, 340-5, and 340-6. The mobile backhaul terminal mounted on the aerial vehicle 330 or 340 may include a horn-shaped antenna having a light weight and directivity within a range that does not significantly affect a flight time.

Each of the at least one terminal 340-1, 340-2, 340-3, 340-4, 340-5, and 340-6 described above may be configured identically or similarly to the terminals 130-1, 130-2, 130-3, 130-4, 130-5, and 130-6 described with reference to FIG. 1. In addition, the communication nodes constituting the communication system 300 including the mobile backhaul network may be configured identically or similarly to the communication node 200 shown in FIG. 2.

Figure 4:
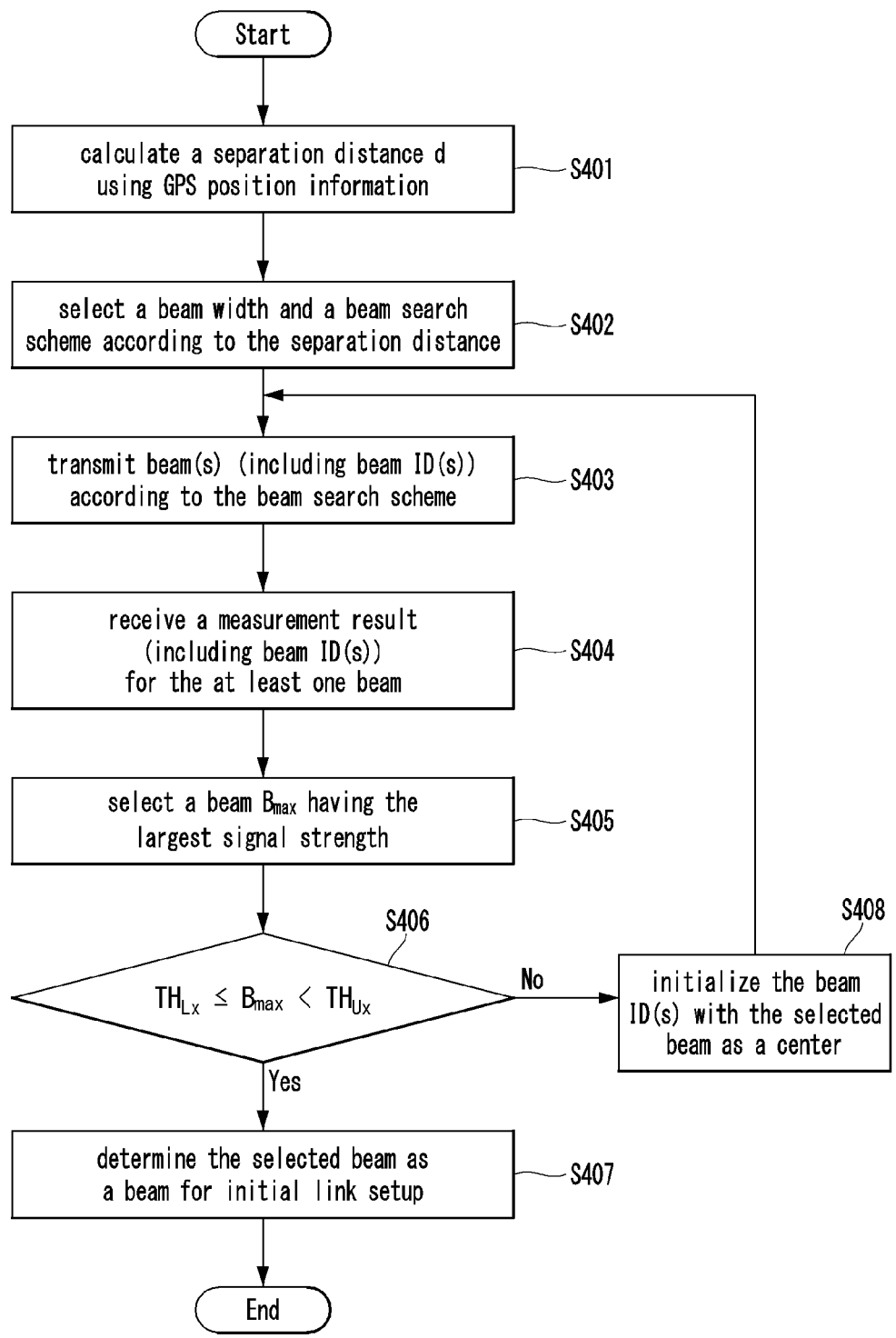
FIG. 4 is a flowchart illustrating a first exemplary embodiment of an initial backhaul link setup procedure of a mobile backhaul system.

FIG. 4 is a flowchart illustrating a first exemplary embodiment of an initial backhaul link setup procedure of a mobile backhaul system.

Referring to FIG. 4, an initial backhaul link setup procedure performed by a mobile backhaul hub may comprise a step S401 of calculating a separation distance between the mobile backhaul hub and a mobile backhaul terminal using GPS position information of the mobile backhaul hub and/or the mobile backhaul terminal; a step S402 of selecting a beam width and a beam search scheme according to the separation distance; a step S403 of transmitting identifier(s)

(ID(s)) of at least one beam through the at least one beam having the selected beam width according to the beam search scheme; a step S404 of receiving the ID(s) of the at least one beam and a measurement result of the at least one beam from the mobile backhaul terminal; a step S405 of selecting a beam $B_{max}$ having the largest signal strength $P_{max}$ based on the measurement result; a step S406 of determining whether the signal strength of the selected beam is greater than or equal to a lower threshold value and less than an upper threshold value; a step S407 of determining the selected beam as a beam for initial backhaul link setup in response to determining that the signal strength of the selected beam is greater than or equal to the lower threshold value and less than the upper threshold value; and a step S408 of initializing the ID(s) of the at least one beam with the selected beam as a center in response to determining that the signal strength of the selected beam is less than the lower threshold value or greater than or equal to the upper threshold value.

As a starting step for the initial mobile backhaul link setup, the mobile backhaul hub may calculate a separation distance d between the mobile backhaul hub and the mobile backhaul terminal using GPS position information of the mobile backhaul hub and/or the mobile backhaul terminal (S401). In addition, the mobile backhaul hub may determine a beam area to which the mobile backhaul terminal belongs based on the separation distance among at least one beam area divided based on a separation maximum distance. The GPS position information may include a latitude $\phi$, longitude $\lambda$, and/or altitude h of the mobile backhaul hub and/or the mobile backhaul terminal.

In an exemplary embodiment, the mobile backhaul hub may receive the GPS position information of the mobile backhaul hub and/or mobile backhaul terminal from GPS satellite(s) when performing the initial backhaul link setup with the mobile backhaul terminal, and determine the separation distance between the mobile backhaul hub and the mobile backhaul terminal based on the GPS position information. The mobile backhaul hub may receive real-time position information of the mobile backhaul hub and/or mobile backhaul terminal from the GPS satellite(s) to determine the separation distance accurately.

In another exemplary embodiment, the mobile backhaul hub may store the GPS position information of the mobile backhaul hub and/or the mobile backhaul terminal in a memory, and may use the GPS position information stored in the memory to calculate the separation distance. When a positional change of the mobile backhaul hub and/or the mobile backhaul terminal is less than or equal to a predetermined distance for a predetermined period of time, the mobile backhaul hub may utilize the GPS position information stored in the memory to determine the separation distance between the mobile backhaul hub and the mobile backhaul terminal. That is, when the positional change of the mobile backhaul hub and/or the mobile backhaul terminal is not large, the mobile backhaul hub may determine the separation distance by using the GPS position information of the mobile backhaul hub and/or the mobile backhaul terminal stored in the memory.

The mobile backhaul hub may use the GPS position information of the mobile backhaul hub and/or the mobile backhaul terminal to calculate the separation distance d between the mobile backhaul hub and the mobile backhaul terminal (S401). For example, the mobile backhaul hub may receive the GPS position information of the mobile backhaul hub and/or the mobile backhaul terminal from the GPS satellite(s), and may determine the separation distance d between the mobile backhaul hub and the mobile backhaul terminal based on the latitudes and/or longitudes of the mobile backhaul hub and mobile backhaul terminal, which are included in the GPS position information.

In an exemplary embodiment, the mobile backhaul hub may use Equation 1 below based on the GPS position information $(\phi_1, \lambda_1)$ of the mobile backhaul hub and/or the GPS position information $(\phi_2, \lambda_2)$ of the mobile backhaul terminal to determine the separation distance d between the mobile backhaul hub and the mobile backhaul terminal. In Equation 1 below, $(\phi_1, \phi_2)$ may mean the latitudes of the mobile backhaul hub and the mobile backhaul terminal, respectively, and $(\lambda_1, \lambda_2)$ may mean the longitudes of the mobile backhaul hub and the mobile backhaul terminal, respectively. r may mean the radius of the earth. In addition, in Equation 1 below, $(D_\phi, M_\phi, S_\phi)$ may mean a 'degree, minutes, and seconds (DMS)' value according to a latitude difference between the mobile backhaul hub and the mobile backhaul terminal, and $(D_\lambda, M_\lambda, S_\lambda)$ may mean a DMS value according to a longitude difference between the mobile backhaul hub and the mobile backhaul terminal. $(\alpha, \beta)$ may be expressed as $$\alpha = \frac{2\pi r}{360} \text{ and } \beta = \cos\frac{\phi_1 + \phi_2}{2} \cdot \alpha,$$

respectively.

$$d = \sqrt{(\phi_2 - \phi_1)^2 + (\lambda_2 - \lambda_1)^2} \qquad \text{[Equation 1]}$$

$$= \sqrt{\left((D_\phi \times \alpha) + \left(M_\phi \times \left(\frac{\alpha}{60}\right)\right) + \left(S_\phi \times \left(\frac{\left(\frac{\alpha}{60}\right)}{60}\right)\right)\right)^2 + \left((D_\lambda \times \beta) + \left(M_\lambda \times \left(\frac{\beta}{60}\right)\right) + \left(S_\lambda \times \left(\frac{\left(\frac{\beta}{60}\right)}{60}\right)\right)\right)^2}$$

In another exemplary embodiment, the mobile backhaul hub may use Equation 2 below based on the GPS position information $(\phi_1, \phi_1)$ of the mobile backhaul hub and/or the GPS position information $(\phi_2, \lambda_2)$ of the mobile backhaul terminal to determine the separation distance d between the mobile backhaul hub and the mobile backhaul terminal. In Equation 2 below, $(\phi_1, \phi_2)$ may mean the latitudes of the mobile backhaul hub and the mobile backhaul terminal, respectively, and $(\lambda_1, \lambda_2)$ may mean the longitudes of the mobile backhaul hub and the mobile backhaul terminal, respectively. r may mean the radius of the earth.

$$d = 2 \cdot r \cdot \arcsin\left(\sqrt{\sin^2\left(\frac{\phi_2 - \phi_1}{2}\right) + \cos(\phi_1)\cos(\phi_2)\sin^2\left(\frac{\lambda_2 - \lambda_1}{2}\right)}\right) \qquad \text{[Equation 2]}$$

The mobile backhaul hub may select a preset beam width $BW_x$ in the beam area to which the mobile backhaul terminal belongs according to the separation distance between the mobile backhaul hub and the mobile backhaul terminal, and may select a preconfigured beam search scheme for the beam area to which the mobile backhaul terminal belongs according to the separation distance between the mobile backhaul hub and the mobile backhaul terminal (S402). The mobile backhaul system may configure the beam area $R_x$, the beam width $BW_x$, and/or the beam search scheme according to the separation distance between the mobile backhaul hub and the mobile backhaul terminal to efficiently search for a beam to be used for initial backhaul link setup between the mobile backhaul hub and the mobile backhaul terminal. The mobile backhaul hub may perform beamforming by selecting the preconfigured beam area, preconfigured beam width, and/or preconfigured beam search scheme according to the separation distance between the mobile backhaul hub and the mobile backhaul terminal based on the GPS position information.

The mobile backhaul hub may transmit signals including ID(s) of at least one beam having the beam width $BW_x$ to the mobile backhaul terminal through the at least one beam by performing beamforming according to the above-described beam area, beam width, and/or beam search scheme (S403). The mobile backhaul terminal may receive the signals from the mobile backhaul hub through the at least one beam, measure a received signal strength of each beam received from the mobile backhaul hub, and transmit the ID(s) of the at least one beam and a measurement result of the at least one beam to the mobile backhaul hub. When the mobile backhaul terminal transmits the ID(s) of the at least one beam and the measurement result of the at least one beam to the mobile backhaul hub, the mobile backhaul hub may receive the ID(s) of the at least one beam and the measurement result of the at least one beam from the mobile backhaul terminal (S404). The mobile backhaul hub may select a beam having the largest signal strength $P_{max}$ based on the above-described measurement result (S405), and may compare the signal strength of the selected beam with an upper threshold value $TH_{Ux}$ and/or a lower threshold value $TH_{Lx}$ (i.e., threshold range) preconfigured according to the beam area $R_x$ (S406). When the signal strength of the selected beam is greater than or equal to the lower threshold value $TH_{Lx}$ and less than the upper threshold value $TH_{Ux}$ (i.e., falls within the threshold range), the mobile backhaul hub may select a beam having the ID of the selected beam as a beam for initial backhaul link setup (S407), and may complete the backhaul link setup with the mobile backhaul terminal to terminate the initial backhaul link setup. However, when the signal strength of the selected beam is less than the lower threshold value $TH_{Lx}$ or greater than or equal to the upper threshold value $TH_{Ux}$ (i.e., is out of the threshold range), the mobile backhaul hub may initialize the ID(s) of the at least one beam with the selected beam as a center. The mobile backhaul hub may transmit the initialized ID(s) of the at least one beam to the mobile backhaul terminal through the at least one beam according to a predetermined beam search scheme to perform the beam search procedure for initial backhaul link setup again (S403).

The above-described initial backhaul link setup method can provide mobile communication services to a terminal by quickly setting up a backhaul link using GPS information of the mobile backhaul hub and/or the mobile backhaul terminal even in a place where an object on the ground is difficult to move. In addition, the above-described initial backhaul link setup method uses GPS position information to select a beam used for initial backhaul link setup by changing a beam width and/or a beam search scheme, thereby flexibly and efficiently performing long-distance communication in response to a positional change of an aerial vehicle equipped with the mobile backhaul terminal. Hereinafter, the beam width selection according to the separation distance between the mobile backhaul hub and the mobile backhaul terminal will be described.

Figure 5:
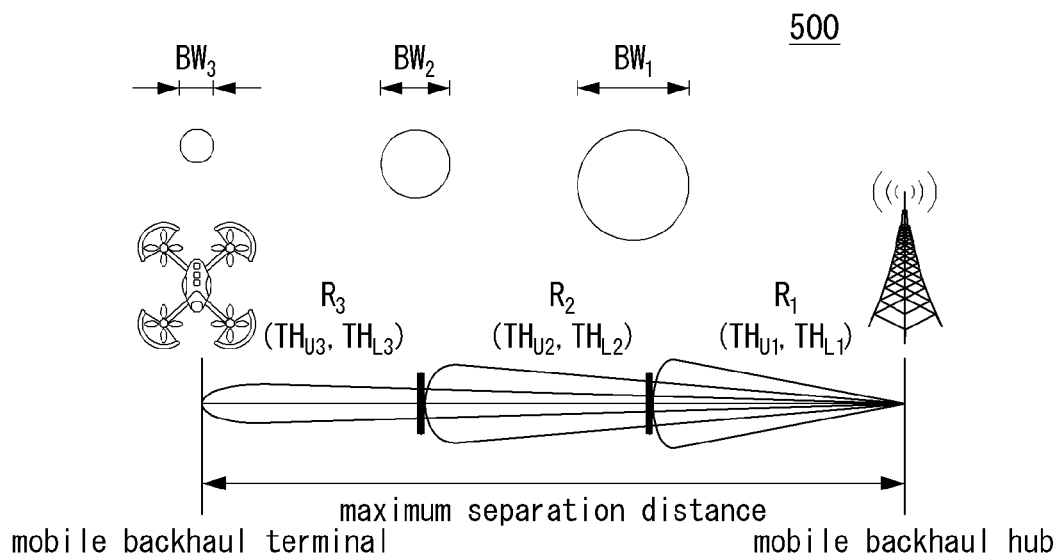
FIG. 5 is a conceptual diagram illustrating a first exemplary embodiment of beam widths used for initial backhaul link setup of a mobile backhaul system.

FIG. 5 is a conceptual diagram illustrating a first exemplary embodiment of beam widths used for initial backhaul link setup of a mobile backhaul system.

Referring to FIG. 5, a beam width 500 used for initial backhaul link setup of the mobile backhaul system may be determined based on the separation distance d between the mobile backhaul hub and the mobile backhaul terminal. When the mobile backhaul hub is far away from the mobile backhaul terminal, the mobile backhaul hub may perform a beam search process for initial backhaul link setup using narrow beams for long-distance communication. On the other hand, when the mobile backhaul hub is near from the mobile backhaul terminal, the mobile backhaul hub may perform a beam search process for initial backhaul link setup using wide beams to quickly search for an initial beam. That is, the mobile backhaul hub may efficiently perform the beam search process by varying the beam width used for initial beam search according to the separation distance between the mobile backhaul hub and the mobile backhaul terminal, thereby reducing a time required for the initial backhaul link setup.

In addition, the mobile backhaul system may determine the maximum separation distance at which the mobile backhaul hub can provide mobile communication services to the mobile backhaul terminal for efficient or reliable communications. The mobile backhaul system may determine beam areas $R_1$, $R_2$, and $R_3$, each of which is an area in which each beam for initial backhaul link setup is formed, based on the above-described maximum separation distance. The mobile backhaul system may determine a beam width $BW_1$, $BW_2$, or $BW_3$ used for initial backhaul link setup according to each beam area. In the mobile backhaul system, upper and/or lower thresholds ($TH_{U1}$, $TH_{L1}$), ($TH_{U2}$, $TH_{L2}$), and ($TH_{U3}$, $TH_{L3}$) may configured for the beam areas, respectively.

The mobile backhaul hub may use GPS position information of the mobile backhaul hub and/or mobile backhaul terminal to determine an initial azimuth angle $\theta_a$ and/or an initial elevation angle $\theta_e$ to which the beam of the mobile backhaul hub is to be directed. The mobile backhaul hub may search for surrounding beams using the above-described initial azimuth angle and/or the above-described initial elevation angle for initial backhaul link setup with the mobile backhaul terminal.

In an exemplary embodiment, the mobile backhaul hub may determine the initial azimuth angle $\theta_a$ to which the beam of the mobile backhaul hub is to be directed for initial backhaul link setup by using Equation 3 below. In Equation 3 below, ($\phi_1$, $\phi_2$) may represent the latitudes of the mobile backhaul hub and the mobile backhaul terminal, respectively, ($\lambda_1$, $\lambda_2$) may represent the longitudes of the mobile backhaul hub and the mobile backhaul terminal, respectively, and $\Delta\lambda$ may represent a longitude difference between the mobile backhaul hub and the mobile backhaul terminal (i.e., $\Delta\lambda=\lambda_2-\lambda_1$).

$$\theta=a\tan 2(\sin\Delta\lambda\cdot\cos\phi_2, \cos\phi_1\cdot\sin\phi_2-\sin\phi_1\cdot\cos\phi_2\cdot\cos\Delta\lambda) \quad \text{[Equation 3]}$$

In another exemplary embodiment, the mobile backhaul hub may determine the initial elevation angle $\theta_e$ to which the beam of the mobile backhaul hub is to be directed for initial backhaul link setup by using Equation 4 below. In Equation 4 below, d may mean the separation distance between the mobile backhaul hub and the mobile backhaul terminal, and $\Delta h$ may mean a height difference between the mobile backhaul hub and the mobile backhaul terminal (i.e., $\Delta h=h_2-h_1$).

$$\theta_b = \tan\left(\frac{\Delta h}{d}\right) \quad \text{[Equation 4]}$$

Hereinafter, beam search methods for initial backhaul link setup according to the separation distance between the mobile backhaul hub and the mobile backhaul terminal will be described.

The mobile backhaul hub may determine the beam width of the beam to be used for initial backhaul link setup, the beam area to which the mobile backhaul terminal belongs, the initial azimuth angle to which the beam of the mobile backhaul hub is to be directed, and/or the initial elevation angle to which the beam of the mobile backhaul hub is to be directed, and may perform a beam search process for initial backhaul link setup based on the aforementioned beam width, beam area, initial azimuth angle, and/or initial elevation angle. In addition, the mobile backhaul hub may perform the beam search process by adjusting the number of beams of the mobile backhaul hub so that an area with the similar size can be searched regardless of the beam area to which the mobile backhaul terminal belongs in order to quickly set up an initial backhaul link.

Figure 6:
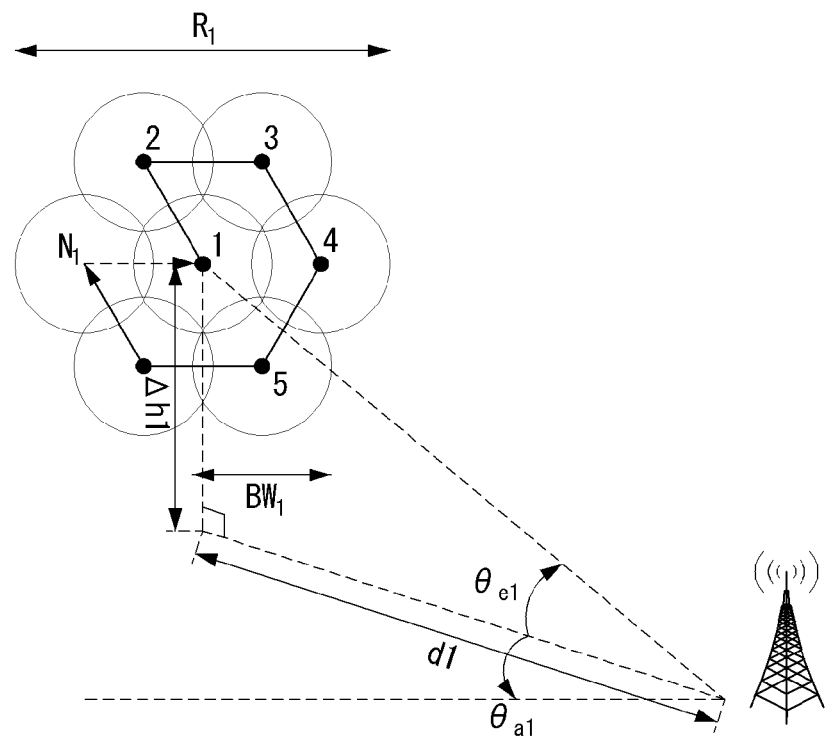
FIG. 6 is a conceptual diagram illustrating a first exemplary embodiment of a beam search method for initial backhaul link setup in a mobile backhaul system.

FIG. 6 is a conceptual diagram illustrating a first exemplary embodiment of a beam search method for initial backhaul link setup in a mobile backhaul system.

Referring to FIG. 6, the mobile backhaul hub may determine a separation distance between the mobile backhaul hub and the mobile backhaul terminal based on GPS position information of the mobile backhaul hub and/or the mobile backhaul terminal, select $BW_1$ as a beam width for initial backhaul link setup based on the separation distance, and select $R_1$ as a beam area for initial backhaul link setup based on the separation distance. The mobile backhaul hub may determine an initial azimuth angle $\theta_{a1}$ and/or an initial elevation angle $\theta_{e1}$ to which a beam of the mobile backhaul hub is to be directed for initial backhaul link setup based on the GPS position information of the mobile backhaul hub and/or the mobile backhaul terminal. That is, the mobile backhaul hub may select a beam search scheme for initial backhaul link setup with the mobile backhaul terminal based on the GPS position information of the mobile backhaul hub and/or the mobile backhaul terminal.

In addition, the mobile backhaul hub may select the number $N_1$ of beams used for the beam search by using the beam width $BW_1$ in the beam area $R_1$. The mobile backhaul hub may determine the number $N_1$ of beams based on the GPS position information of the mobile backhaul terminal, the separation distance $d_1$ between the mobile backhaul hub and the mobile backhaul terminal, the selected beam width B, and/or the beam area $R_1$. Alternatively, the number $N_1$ of beams may be preconfigured in the beam area $R_1$ of the mobile backhaul system. The mobile backhaul hub may start the beam search with the initial azimuth angle $\theta_{a1}$ and/or initial elevation angle $\theta_{e1}$ as a center by using $N_1$ beams having the beam width $BW_1$. Although the beam search scheme in the area $R_1$ having the largest beam width may be used in other areas $R_2$ and $R_3$, as the width of the transmission or reception beam becomes narrower, the search area decreases, and thus the time required for initial backhaul link setup may increase. Therefore, in the beam search for initial backhaul link setup, beam search and/or beamforming may be performed by adjusting the number of beams of the mobile backhaul hub so that the same area can be searched as much as possible regardless of the area to which the mobile backhaul terminal belongs.

Figure 7:
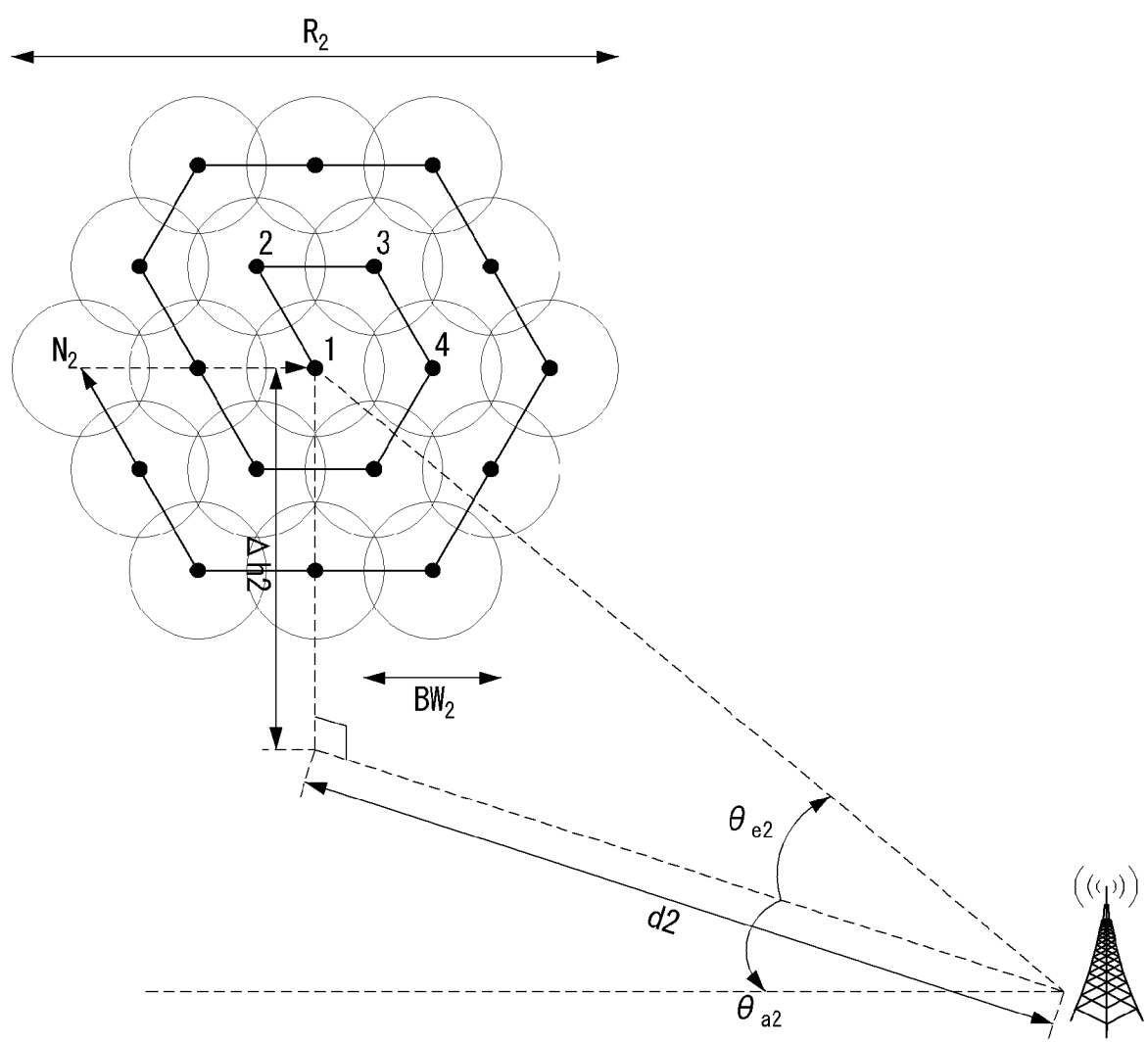
FIG. 7 is a conceptual diagram illustrating a second exemplary embodiment of a beam search method for initial backhaul link setup in a mobile backhaul system.

FIG. 7 is a conceptual diagram illustrating a second exemplary embodiment of a beam search method for initial backhaul link setup in a mobile backhaul system.

Referring to FIG. 7, the mobile backhaul hub may determine a separation distance between the mobile backhaul hub and the mobile backhaul terminal based on GPS position information of the mobile backhaul hub and/or the mobile backhaul terminal, select $BW_2$ as a beam width for initial backhaul link setup based on the separation distance, and select $R_2$ as a beam area for initial backhaul link setup based on the separation distance. The mobile backhaul hub may determine an initial azimuth angle $\theta_{a2}$ and/or initial elevation angle $\theta_{e2}$ to which a beam of the mobile backhaul hub is to be directed for initial backhaul link setup based on the GPS position information of the mobile backhaul hub and/or the mobile backhaul terminal.

In addition, the mobile backhaul hub may select the number $N_2$ of beams to be used for the beam search by using the beam width $BW_2$ in the beam area $R_2$. The mobile backhaul hub may determine the number $N_2$ of beams based on the GPS position information of the mobile backhaul terminal, the separation distance $d_2$ between the mobile backhaul hub and the mobile backhaul terminal, the selected beam width $BW_2$, and/or the beam area $R_2$. Alternatively, the number $N_2$ of beams may be preconfigured in the beam area $R_2$ of the mobile backhaul system. The mobile backhaul hub may start the beam search with the initial azimuth angle $\theta_{a2}$ and/or initial elevation angle $\theta_{e2}$ as a center by using $N_2$ beams having the beam width $BW_2$ in the area $R_2$. The mobile backhaul hub may perform the beam search and/or beamforming by adjusting the number $N_2$ of beams to satisfy $N_1 \leq N_2$ so that areas having the same size can be searched as much as possible regardless of the area to which the mobile backhaul terminal belongs.

Figure 8:
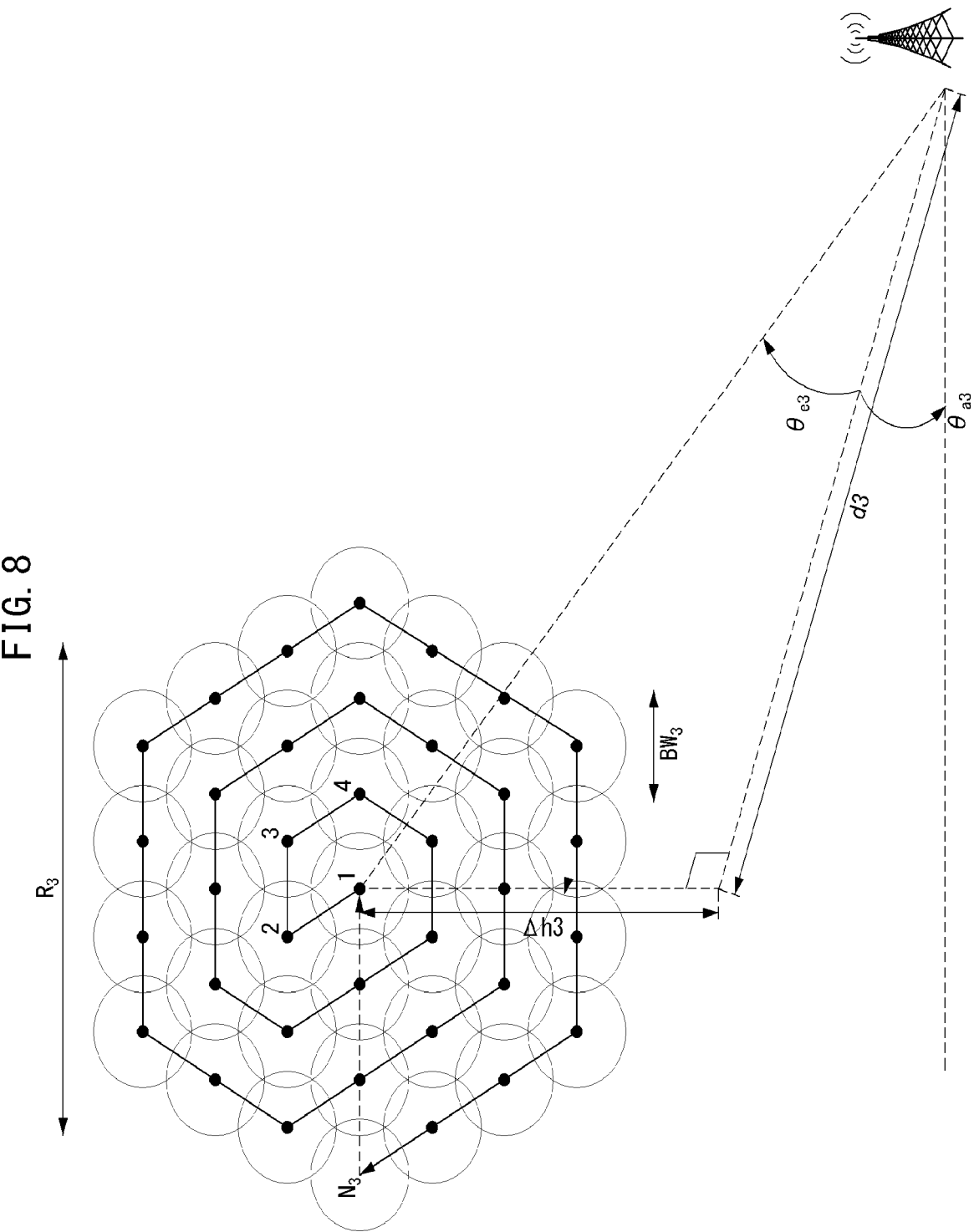
FIG. 8 is a conceptual diagram illustrating a third exemplary embodiment of a beam search method for initial backhaul link setup in a mobile backhaul system.

FIG. 8 is a conceptual diagram illustrating a third exemplary embodiment of a beam search method for initial backhaul link setup in a mobile backhaul system.

Referring to FIG. 8, the mobile backhaul hub may determine a separation distance between the mobile backhaul hub and the mobile backhaul terminal based on GPS position information of the mobile backhaul hub and/or the mobile backhaul terminal, select $BW_3$ as a beam width for initial backhaul link setup based on the separation distance, and select $R_3$ as a beam area for initial backhaul link setup based on the separation distance. The mobile backhaul hub may determine an initial azimuth angle $\theta_{a3}$ and/or initial elevation angle $\theta_{e3}$ to which a beam of the mobile backhaul hub is to be directed for initial backhaul link setup based on the GPS position information of the mobile backhaul hub and/or the mobile backhaul terminal.

In addition, the mobile backhaul hub may select the number $N_3$ of beams to be used for the beam search by using the beam width $BW_3$ in the beam area $R_3$. The mobile backhaul hub may determine the number $N_3$ of beams based on the GPS position information of the mobile backhaul terminal, the separation distance $d_3$ between the mobile backhaul hub and the mobile backhaul terminal, the selected beam width $BW_3$, and/or the beam area $R_3$. Alternatively, the number $N_3$ of beams may be preconfigured in the beam area $R_3$ of the mobile backhaul system. The mobile backhaul hub may start the beam search with the an initial azimuth $\theta_{a3}$ and/or initial elevation $\theta_{e3}$ as a center by using $N_3$ beams having the beam width $BW_3$ in the area $R_3$. The mobile backhaul hub may perform the beam search and/or beamforming by adjusting the number $N_3$ of beams to satisfy $N_2 \leq N_3$ so that the areas having the same size can be searched as much as possible regardless of the area to which the mobile backhaul terminal belongs.

The mobile backhaul hub may perform the beam search process for initial backhaul link setup according to the above-described beam search scheme, and transmit ID(s) of at least one beam through the at least one beam by forming the at least one beam according to the beam search scheme. The mobile backhaul hub may receive a signal strength measurement result for the at least one beam transmitted according to the beam search scheme. The mobile backhaul hub may select a beam having the largest received signal strength based on the signal strength measurement result, and when the received signal strength of the selected beam is within a threshold range configured in the beam area, the mobile backhaul hub may determine the selected beam as a beam for initial link setup. Hereinafter, a beam re-search procedure performed by the mobile backhaul hub when the received signal strength of the selected beam is out of the threshold value range configured in the beam area will be described.

Figure 9:
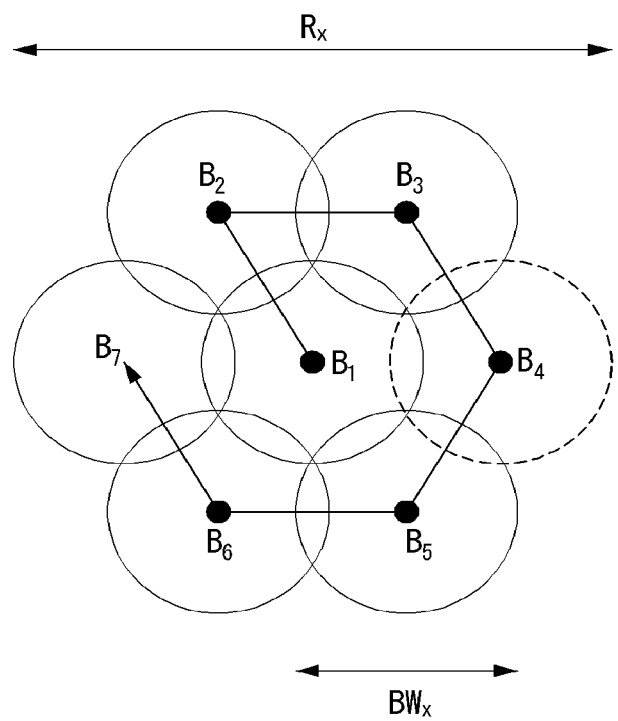
FIG. 9 is a conceptual diagram illustrating a first exemplary embodiment of a beam determination method for initial backhaul link setup in a mobile backhaul system.

FIG. 9 is a conceptual diagram illustrating a first exemplary embodiment of a beam determination method for initial backhaul link setup in a mobile backhaul system.

Referring to FIG. 9, the mobile backhaul hub may perform the beam search process according to the beam area $R_x$, the beam width $BW_1$, and/or the beam search scheme (i.e., $B_1 \rightarrow B_2 \rightarrow B_3 \ldots \rightarrow B_7$) determined according to the separation distance between the mobile backhaul hub and the mobile backhaul terminal, thereby receiving a measurement result of the at least one beam (i.e., $B_1 \rightarrow B_2 \rightarrow B_3 \ldots \rightarrow B_7$) from the mobile backhaul terminal. For example, the mobile backhaul hub may select the beam $B_4$ having the largest received signal strength $P_{max}$ among the received signal strengths of the at least one beam based on the measurement result (i.e., $P_{max}=P_{B_4}$) and compare the signal strength $P_{B_4}$ of the selected beam $B_4$ with an upper threshold value $TH_{Ux}$ and/or a lower threshold value $TH_{Lx}$ configured in the beam area. In this case, when the signal strength $P_{B_4}$ of the selected beam $B_4$ is less than the lower threshold value (i.e., $P_{B_4}<TH_{Lx}$), the mobile backhaul hub may perform a beam re-search process with the selected beam $B_4$ as a center. Hereinafter, the beam re-search process performed by the mobile backhaul hub with the selected beam $B_4$ as a center will be described.

Figure 10:
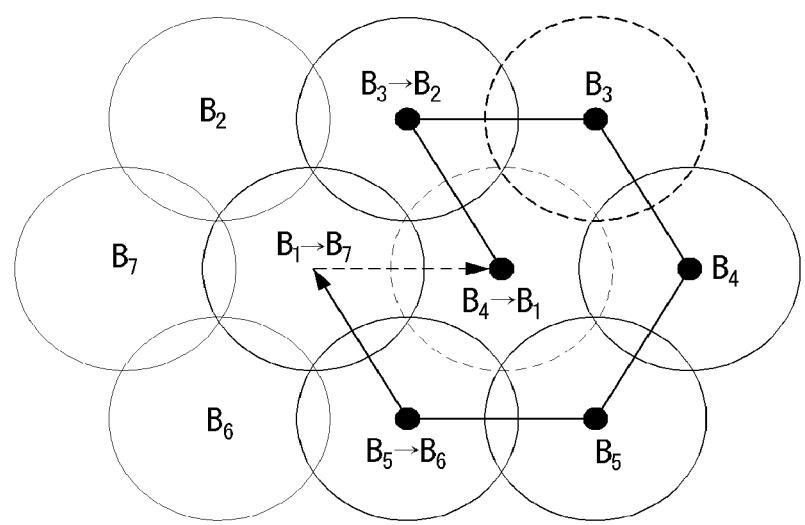
FIG. 10 is a conceptual diagram illustrating a second exemplary embodiment of a beam determination method for initial backhaul link setup in a mobile backhaul system.

FIG. 10 is a conceptual diagram illustrating a second exemplary embodiment of a beam determination method for initial backhaul link setup in a mobile backhaul system.

Referring to FIG. 10, when the largest signal strength $P_{B_4}$ is less than the lower threshold value (i.e., $P_{B_4}<TH_{Lx}$), the mobile backhaul hub may initialize the ID(s) of the at least one beam and may reconfigure the ID(s) of the at least one beam (i.e., $B_4 \rightarrow B_1$, $B_1 \rightarrow B_7$, $B_5 \rightarrow B_6$) with the selected beam $B_4$ as a center, and receive a measurement result of the at least one beam (i.e., $P_{B_1}, P_{B_2}, \ldots, P_{B_7}$) by performing the beam re-search process with the selected beam $B_4$ as a center. The mobile backhaul hub may re-select the beam $B_3$ having the largest signal strength $P_{max}$ based on the measurement result (i.e., $P_{max}=P_{B_3}$), and compare the signal strength $P_{B_3}$ of the re-selected beam $B_3$ with the upper threshold value $TH_{Ux}$ and/or lower threshold value $TH_{Lx}$ configured in the beam area. In this case, when the signal strength $P_{B_3}$ of the selected beam $B_3$ is less than the lower threshold value (i.e., $P_{B_3}<TH_{Lx}$), the mobile backhaul hub may perform a beam re-search process with the selected beam $B_3$ as a center. On the other hand, when the signal strength $P_{B_3}$ of the selected beam $B_3$ is equal to or greater than the upper threshold value (i.e., $P_{B_3} \geq TH_{Ux}$), the mobile backhaul hub may not perform a beam re-search process.

Figure 11:
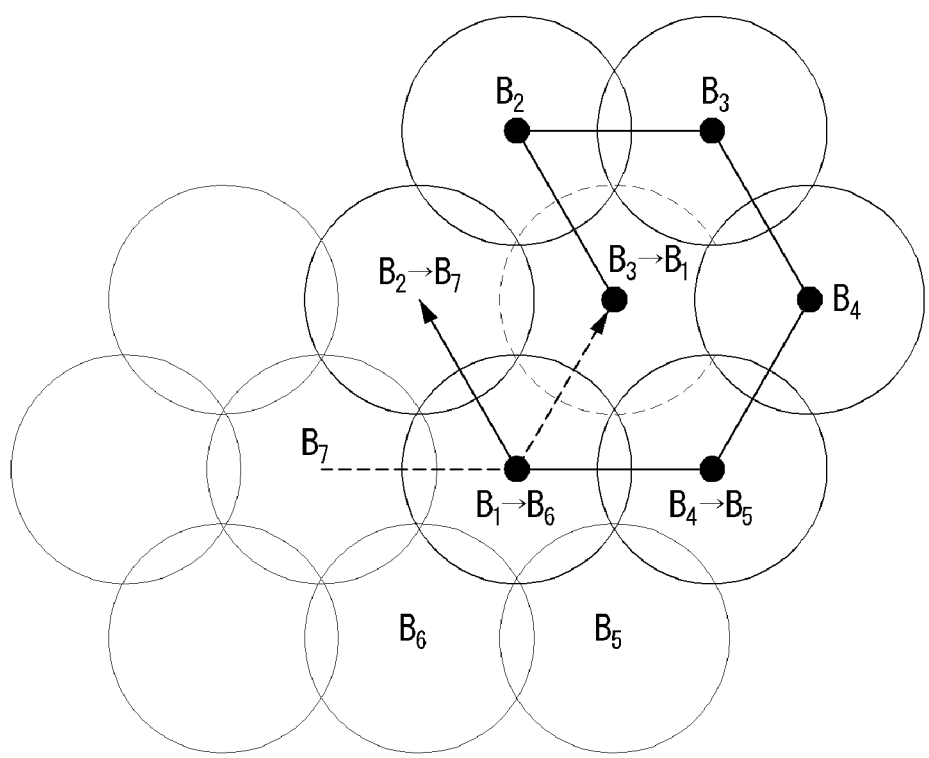
FIG. 11 is a conceptual diagram illustrating a third exemplary embodiment of a beam determination method for initial backhaul link setup in a mobile backhaul system.

FIG. 11 is a conceptual diagram illustrating a third exemplary embodiment of a beam determination method for initial backhaul link setup in a mobile backhaul system.

Referring to FIG. 11, when the largest signal strength $P_{B_3}$ is less than the lower threshold value (i.e., $P_{B_3}<TH_{Lx}$), the mobile backhaul hub may initialize the ID(s) of the at least one beam and may reconfigure the ID(s) of the at least one beam (i.e., $B_3 \rightarrow B_1$, $B_1 \rightarrow B_6$, $B_2 \rightarrow B_7$, $B_4 \rightarrow B_5$) with the selected beam $B_3$ as a center, and receive a measurement result of the at least one beam (i.e., $P_{B_1}, P_{B_2}, \ldots, P_{B_7}$) by performing the beam re-search process with the selected beam $B_3$ as a center. The mobile backhaul hub may re-select a beam $B_x$ having the largest signal strength $P_{max}$ based on the measurement result (i.e., $P_{max}=P_{B_x}$), determine the selected beam $B_x$ as a beam for initial backhaul link setup when the signal strength $P_{b_x}$ of the selected beam $B_x$ is within the threshold range ($TH_{Ux}, TH_{Lx}$) configured in the beam area, and repeatedly perform the above-described process for beam determination until the initial backhaul link setup is completed.

Meanwhile, even after the initial backhaul link is established between the mobile backhaul hub and the mobile backhaul terminal, a situation wherein a beam signal strength $B_{pow}$ of the backhaul link is out of the threshold range ($TH_{Ux}, TH_{Lx}$) may occur due to a change in the communication environment, such as hovering or moving of an aerial vehicle on which the mobile backhaul terminal is mounted and/or atmospheric attenuation or rainfall attenuation. Accordingly, the mobile backhaul hub may manage the backhaul link between the mobile backhaul hub and the mobile backhaul terminal by determining whether the beam area has changed and/or whether the signal strength is within the threshold range.

To this end, the mobile backhaul hub may calculate the separation distance d using GPS position information, and measure strengths of beams received from the mobile backhaul terminal. The mobile backhaul hub may change a beam width by comparing the signal strength of the received beam with the above-described threshold values, or may manage the mobile backhaul link so that the optimal backhaul link can be maintained by performing the beam re-search process. Hereinafter, a backhaul link management method performed after the initial backhaul link between the mobile backhaul hub and the mobile backhaul terminal is established will be described.

Figure 12:
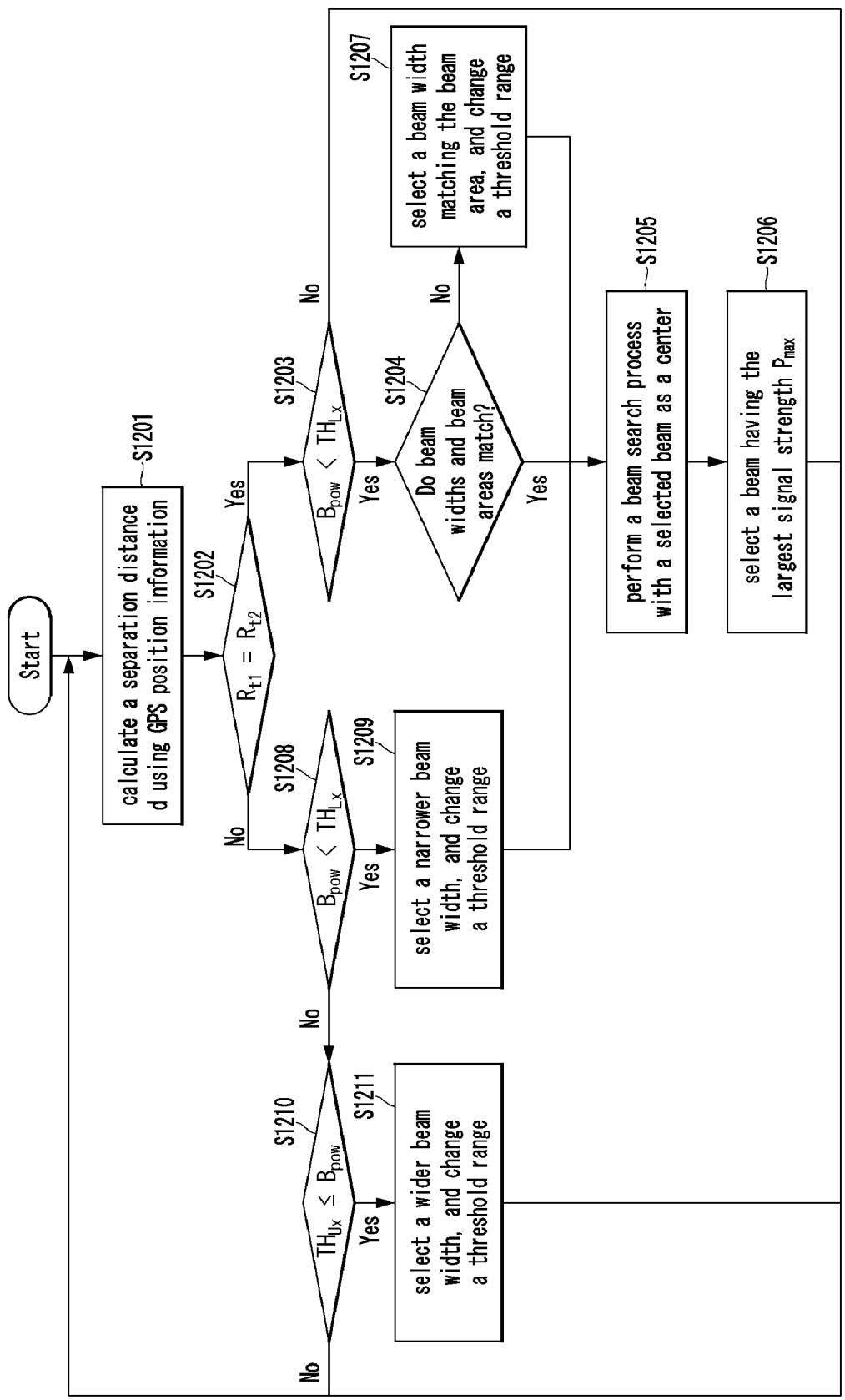
FIG. 12 is a flowchart illustrating a first exemplary embodiment of a backhaul link management procedure of a mobile backhaul system.

FIG. 12 is a flowchart illustrating a first exemplary embodiment of a backhaul link management procedure of a mobile backhaul system.

After the initial backhaul link between the mobile backhaul hub and the mobile backhaul terminal is established, the backhaul link between the mobile backhaul hub and the mobile backhaul terminal may be periodically managed. After the initial backhaul link between the mobile backhaul hub and the mobile backhaul terminal is established, the mobile backhaul hub may periodically receive GPS position information from the mobile backhaul terminal.

Referring to FIG. 12, the backhaul link management procedure of the mobile backhaul system may comprise a step S1201 of calculating a separation distance d using GPS position information; a step S1202 of determining whether the position of the mobile backhaul terminal is not changed from the beam area to which the mobile backhaul terminal previously belongs based on the GPS position information and/or the separation distance d; a step S1203 of comparing the signal strength $B_{pow}$ of the beam received from the mobile backhaul terminal with the lower threshold value $TH_{Lx}$ configured in the beam area to which the mobile backhaul terminal belongs in response to determining that the beam area to which the mobile backhaul terminal belongs is not changed in the step S1202; a step S1204 of determining whether the beam width and/or beam area of the signal currently transmitted to the mobile backhaul terminal matches the beam width $BW_x$ and/or beam area $R_x$ selected in the previous link setup and/or management procedure in response to determining that the signal strength $B_{pow}$ of the received beam is less than the lower threshold value $TH_{Lx}$ configured in the beam area; and a step S1205 of performing a beam search process with the beam selected in the previous initial backhaul link setup and/or management procedure as a center when the beam widths and/or beam areas match, respectively.

In addition, the backhaul link management procedure of the mobile backhaul system may further comprise a step S1206 of selecting a beam having the largest signal strength $P_{max}$ in the beam search process as a beam for a backhaul link between the mobile backhaul hub and the mobile backhaul terminal; and a step S1207 of selecting a beam width matching the beam area or changing the threshold value range configured in the beam area by changing the previously-configured upper threshold value and/or lower threshold value when the beam widths or beam areas do not match.

In addition, the backhaul link management procedure of the mobile backhaul system may further comprise a step S1208 of comparing the signal strength $B_{pow}$ of the beam received from the mobile backhaul terminal with the lower threshold value $TH_{Lx}$ configured in the beam area to which the mobile backhaul terminal belongs in response to determining that the beam area to which the mobile backhaul terminal belongs is changed in the step S1202; and a step S1209 of selecting a beam width less than the previously-selected beam width or changing the threshold range configured in the beam area by changing the previously-configured upper threshold value and/or lower threshold value when the signal strength $B_{pow}$ of the received beam is less than the lower threshold value $TH_{Lx}$ configured in the beam area to which the mobile backhaul terminal belongs.

In addition, the backhaul link management procedure of the mobile backhaul system may further comprise a step S1210 of comparing the signal strength $B_{pow}$ that the mobile backhaul hub receives from the mobile backhaul terminal with the upper threshold value $TH_{Ux}$ configured in the beam area to which the mobile backhaul terminal belongs in response to determining that the signal strength $B_{pow}$ of the received beam is equal to or greater than the lower threshold value $TH_{Lx}$ configured in the beam area to which the mobile backhaul terminal belongs in the step S1208.

In addition, the backhaul link management procedure of the mobile backhaul system may further comprise may comprise a step S1211 of selecting a beam width wider than the previously-selected beam width or changing the threshold range configured in the beam area by changing the previously-configured upper threshold value and/or lower threshold value in response to determining that the signal strength $B_{pow}$ of the received beam is equal to or greater than the upper threshold value $TH_{Ux}$ configured in the beam area to which the mobile backhaul terminal belongs in the step S1210.

After the initial backhaul link setup between the mobile backhaul hub and the mobile backhaul terminal, the mobile backhaul hub receiving the GPS position information of the mobile backhaul terminal may calculate the separation distance d with the mobile backhaul terminal (S1201), and determine whether the position of the mobile backhaul terminal has been changed from the previous area based on the GPS position information and/or the separation distance (S1202).

If the area $R_{t1}$ to which the mobile backhaul terminal belongs at a time $t_1$ and the area $R_{t2}$ to which the mobile backhaul terminal belongs at a time $t_2$ are identical to each other (i.e., $R_{t1}=R_{t2}$), the mobile backhaul hub may compare the signal strength $B_{pow}$ of the beam received from the mobile backhaul terminal with the lower threshold value $TH_{Lx}$ configured in the area to which the mobile backhaul terminal belongs (S1203). When the signal strength $B_{pow}$ of the received beam is equal to or greater than the lower threshold value $TH_{Lx}$, the mobile backhaul hub may terminate link management and may not perform link management for a preconfigured time. On the other hand, when the signal strength $B_{pow}$ of the received beam is less than the lower threshold value $TH_{Lx}$, the mobile backhaul hub may compare the beam width of the signal currently transmitted to the mobile backhaul terminal matches the beam width $BW_x$ selected in the link setup and/or management procedure, and may identify whether the beam area to which the mobile backhaul terminal currently belongs matches the beam area selected in the link setup and/or management procedure (S1204). When the beam widths and the beam areas match, respectively, the mobile backhaul terminal may consider that a problem has occurred in the backhaul link due to an external factor, so the mobile backhaul hub may perform a beam search process with the beam selected in the previous initial backhaul link setup procedure and/or backhaul link management procedure as a center (S1205).

The mobile backhaul hub may select a beam having the largest signal strength $P_{max}$ in the beam search process as a beam for the backhaul link between the mobile backhaul hub and the mobile backhaul terminal (S1206). The mobile backhaul hub may perform the step S1201 of calculating the separation distance using GPS position information again after performing the above-described step S1206 of beam selection. The mobile backhaul hub may repeatedly perform the backhaul link management procedure of the mobile backhaul system until the beam management is terminated.

On the other hand, when the above-described beam widths or beam areas do not match, the mobile backhaul hub may select a beam width that matches the beam area to which the mobile backhaul terminal currently belongs, or change the threshold range configured in the beam area by changing the previously-configured upper threshold value and/or lower threshold value (S1207). The mobile backhaul hub may perform a beam search process with the beam selected in the initial backhaul link setup procedure and/or the backhaul link management procedure as a center based on the matched beam width and/or the changed threshold range (S1205). The mobile backhaul hub may select a beam having the largest signal strength $P_{max}$ in the beam search process as a beam for the backhaul link between the mobile backhaul hub and the mobile backhaul terminal (S1206). The mobile backhaul hub may perform the step S1201 of calculating the separation distance using GPS position information again after performing the above-described step S1206 of beam selection.

In the above-described step S1202 of determining whether the position of the mobile backhaul terminal has been changed from the previous area based on the GPS position information and/or the separation distance d, if the area $R_{t1}$ to which the mobile backhaul terminal belongs at the time $t_1$ and the area $R_{t2}$ to which the mobile backhaul terminal belongs at the time $t_2$ are different from each other (i.e., $R_{t1} \neq R_{t2}$), the mobile backhaul hub may compare the signal strength $B_{pow}$ of the beam received from the mobile backhaul terminal with the lower threshold value $TH_{Lx}$ configured in the area to which the mobile backhaul terminal belongs (S1208). When the signal strength $B_{pow}$ of the received beam is determined to be less than the lower threshold value $TH_{Lx}$ in the step S1208, the mobile backhaul hub may select a beam width narrower than the beam width selected in the previous initial backhaul link setup procedure and/or backhaul link management procedure, and change the threshold range configured in the beam area by changing the upper threshold value and/or lower threshold value configured in the previous initial backhaul link setup procedure and/or backhaul link management procedure (S1209).

The mobile backhaul hub may perform a beam search process with the above-mentioned beam as a center based on the narrower beam width and/or changed threshold range (S1205), and may select a beam having the largest signal strength $P_{max}$ in the beam search process as a beam for the mobile backhaul link between the mobile backhaul hub and the mobile backhaul terminal (S1206). The mobile backhaul hub may perform the step S1201 of calculating the separation distance using GPS position information again after performing the above-described step S1206 of beam selection. The mobile backhaul hub may repeatedly perform the backhaul link management procedure of the mobile backhaul system until the beam management is terminated.

On the other hand, when the signal strength $B_{pow}$ of the received beam is determined to be equal to or greater than the lower threshold value $TH_{Lx}$ in the step S1208, the mobile backhaul hub may compare the signal strength $B_{pow}$ of the beam received from the mobile backhaul terminal with the upper threshold value $TH_{Ux}$ configured in the area to which the mobile backhaul terminal belongs (S1210).

When the signal strength $B_{pow}$ of the received beam is determined to be equal to or less than the upper threshold value $TH_{Ux}$ in the step S1210, the mobile backhaul hub may select a beam width wider than the beam width selected in the previous initial backhaul link setup procedure and/or backhaul link management procedure, and change the threshold range configured in the beam area by changing the upper threshold value and/or lower threshold value configured in the previous initial backhaul link setup procedure and/or backhaul link management procedure (S1211).

That is, when the signal strength $B_{pow}$ of the received beam is determined to be equal to or greater than the upper threshold value $TH_{Ux}$ in the step S1210, the mobile backhaul hub may select a beam width wider than the beam width selected in the previous initial backhaul link setup procedure and/or backhaul link management procedure, and change the threshold range configured in the beam area by changing the upper threshold value and/or lower threshold value configured in the previous initial backhaul link setup procedure and/or backhaul link management procedure (S1211). The mobile backhaul hub may perform the step S1201 of calculating the separation distance using GPS position information again after performing the above-described S1206 step of beam selection. The mobile backhaul hub may repeatedly perform the backhaul link management procedure of the mobile backhaul system until the beam management is terminated. Hereinafter, condition(s) on whether the mobile backhaul hub changes the beam width and/or performs the beam re-search process in the above-described backhaul link management procedure after the initial backhaul link between the mobile backhaul hub and the mobile backhaul terminal is established will be described.

Table 1 below shows whether beam width change and/or beam re-search is performed in the backhaul link management procedure performed by the mobile backhaul hub after the initial backhaul link is established between the mobile backhaul hub and the mobile backhaul terminal. The mobile backhaul hub may determine whether to change the beam width $BW_x$ and whether to perform the beam re-search process based on the separation distance between the mobile backhaul hub and the mobile backhaul terminal calculated using GPS position information in the backhaul link management procedure, and a comparison result between the signal strength $B_{pow}$ of the beam selected in the previous initial backhaul link setup procedure and/or backhaul link management procedure and the threshold range ($TH_{Ux}$, $TH_{Lx}$)

TABLE 1

| Area change due to separation distance | Result of comparison with threshold values | Beam width change | Beam re-search |
|---|---|---|---|
| Not changed ($R_{t1} = R_{t2}$) | $TH_{Lx} \leq B_{pow} < TH_{Ux}$ | Not required | No required |
| | $B_{pow} < TH_{Lx}$ | Not required when beam widths and beam areas match, respectively Required when beam widths and beam areas do not match, respectively | Required |
| | $TH_{Ux} \leq B_{pow}$ | Not required | No required |
| Changed ($R_{t1} \neq R_{t2}$) | $TH_{Lx} \leq B_{pow} < TH_{Ux}$ | Not required | No required |
| | $B_{pow} < TH_{Lx}$ | Required | Required |
| | $TH_{Ux} \leq B_{pow}$ | Required | Required |

Referring to Table 1 above, when there is no change in the area depending on the separation distance between the mobile backhaul hub and the mobile backhaul terminal (i.e., $R_{t1}=R_{t2}$), and the signal strength $B_{pow}$ of the beam received by the mobile backhaul hub from the mobile backhaul terminal is less than the upper threshold value $TH_{Ux}$ and equal to or greater than the lower threshold $TH_{Lx}$ (i.e., $TH_x \leq B_{pow} < TH_{Ux}$), or when there is no change in the area depending on the separation distance between the mobile backhaul hub and the mobile backhaul terminal (i.e., $R_{t1}=R_{t2}$), and the signal strength $B_{pow}$ of the received beam is greater than or equal to the upper threshold value $TH_{Ux}$ (i.e., $TH_{Ux} \leq B_{pow}$), the mobile backhaul hub may not perform the beam width change and the beam re-search process in the backhaul link management procedure.

On the other hand, when there is no change in the area depending on the separation distance between the mobile backhaul hub and the mobile backhaul terminal (i.e., $R_{t1}=R_{t2}$), and the signal strength $B_{pow}$ of the beam received by the mobile backhaul hub from the mobile backhaul terminal is less than the lower threshold value $TH_{Lx}$, the mobile backhaul hub may perform the beam re-search process in the backhaul link management procedure. In addition, when the beam width of the signal currently transmitted to the mobile backhaul terminal matches the beam width $BW_x$ selected in the previous link setup and/or management procedure, and the beam area in which the mobile backhaul terminal is currently located matches the beam area $R_x$ selected in the previous link setup and/or management procedure, the mobile backhaul hub may not change the beam width for the beam re-search process in the backhaul link management procedure.

On the other hand, when the beam width of the signal currently transmitted to the mobile backhaul terminal does not match the beam width $BW_x$ selected in the previous link setup and/or management procedure, or when the beam area in which the mobile backhaul terminal is currently located does not match the beam area $R_x$ selected in the previous link setup and/or management procedure, the mobile backhaul hub may change the beam width for the beam re-search process in the backhaul link management procedure.

When there is a change in the area depending on the separation distance between the mobile backhaul hub and the mobile backhaul terminal (i.e., $R_{t1} \neq R_{t2}$), and the signal strength $B_{pow}$ of the beam received by the mobile backhaul hub from the mobile backhaul terminal is less than the upper threshold value $TH_{Ux}$ and equal to or greater than the lower threshold $TH_{Lx}$ (i.e., $TH_{Lx} \leq B_{pow} < TH_{Ux}$), or when there is a change in the area depending on the separation distance between the mobile backhaul hub and the mobile backhaul terminal (i.e., $R_{t1} \neq R_{t2}$), and the signal strength $B_{pow}$ of the received beam is greater than or equal to the upper threshold value $TH_{Ux}$ (i.e., $TH_{Ux} \leq B_{pow}$), the mobile backhaul hub may not perform the beam width change and the beam re-search process in the backhaul link management procedure.

On the other hand, when there is a change in the area depending on the separation distance between the mobile backhaul hub and the mobile backhaul terminal (i.e., $R_{t1} \neq R_{t2}$), and the signal strength $B_{pow}$ of the beam received by the mobile backhaul hub from the mobile backhaul terminal is greater than or equal to than the upper threshold value $TH_{Ux}$, the backhaul hub may change the beam width selected in the previous link set and/or management procedure to a wider beam width (e.g., $BW_2 \rightarrow BW_1$), and perform the beam re-search process based on the changed beam width.

When there is a change in the area depending on the separation distance between the mobile backhaul hub and the mobile backhaul terminal (i.e., $R_{t1} \neq R_{t2}$), and the signal strength $B_{pow}$ of the beam received by the mobile backhaul hub from the mobile backhaul terminal is less than the lower threshold value $TH_{Lx}$, the backhaul hub may change the beam width selected in the previous link set and/or management procedure to a narrower beam width (e.g., $BW_2 \rightarrow BW_3$), and perform the beam re-search process based on the changed beam width. Hereinafter, a beam re-search method that the mobile backhaul hub can perform for managing the backhaul link of the mobile backhaul system will be described.

Figure 13:
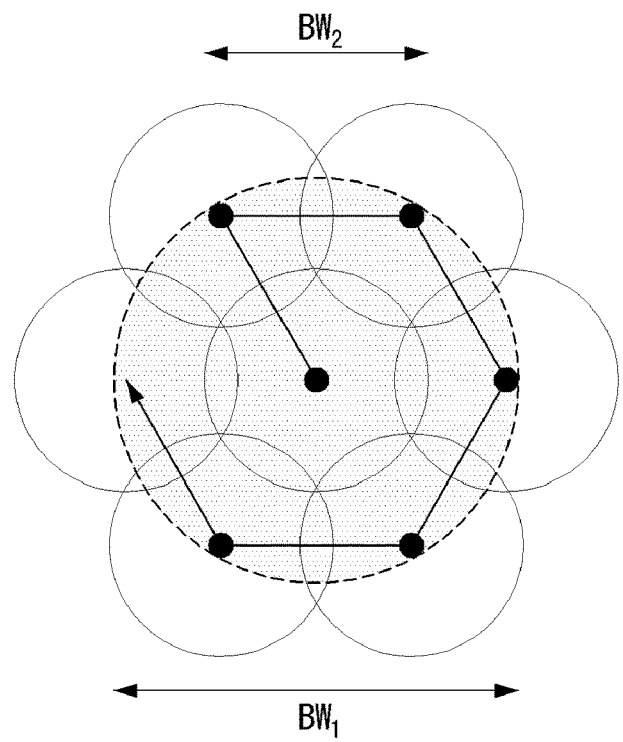
FIG. 13 is a conceptual diagram illustrating a first exemplary embodiment of a backhaul link management method in a mobile backhaul system.

FIG. 13 is a conceptual diagram illustrating a first exemplary embodiment of a backhaul link management method in a mobile backhaul system.

Referring to FIG. 13, the mobile backhaul hub may periodically calculate the separation distance between the mobile backhaul hub and the mobile backhaul terminal for backhaul link management. In response to determining that the beam area to which the mobile backhaul terminal belongs has been changed from $R_2$ to $R_1$ as a result of calculating the separation distance, if the signal strength $B_{pow}$ of the beam received from the mobile backhaul terminal is greater than an upper threshold $TH_{U2}$ configured in the area $R_2$, the mobile backhaul hub may perform the beam re-search process using a wider beam width $BW_1$ than the previously-used beam width $BW_2$.

Figure 14:
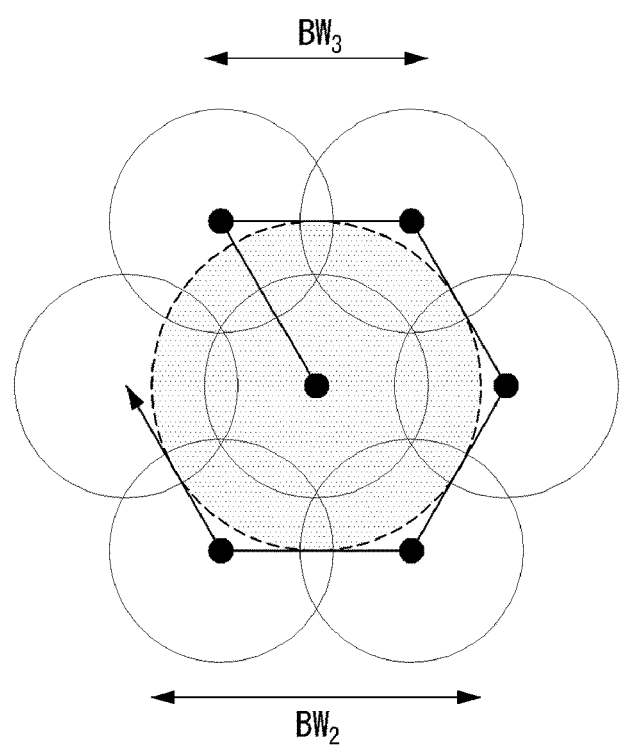
FIG. 14 is a conceptual diagram illustrating a second exemplary embodiment of a backhaul link management method in a mobile backhaul system.

FIG. 14 is a conceptual diagram illustrating a second exemplary embodiment of a backhaul link management method in a mobile backhaul system.

Referring to FIG. 14, the mobile backhaul hub may periodically calculate the separation distance between the mobile backhaul hub and the mobile backhaul terminal for backhaul link management. In response to determining that the beam area to which the mobile backhaul terminal belongs has been changed from $R_3$ to $R_2$ as a result of calculating the separation distance, if the signal strength $B_{pow}$ of the beam received from the mobile backhaul terminal is greater than an upper threshold $TH_{U2}$ configured in the area $R_2$ (i.e., $B_{pow} > TH_{U2}$), the mobile backhaul hub may perform the beam re-search process using a wider beam width $BW_2$ than the previously-used beam width $BW_3$.

Figure 15:
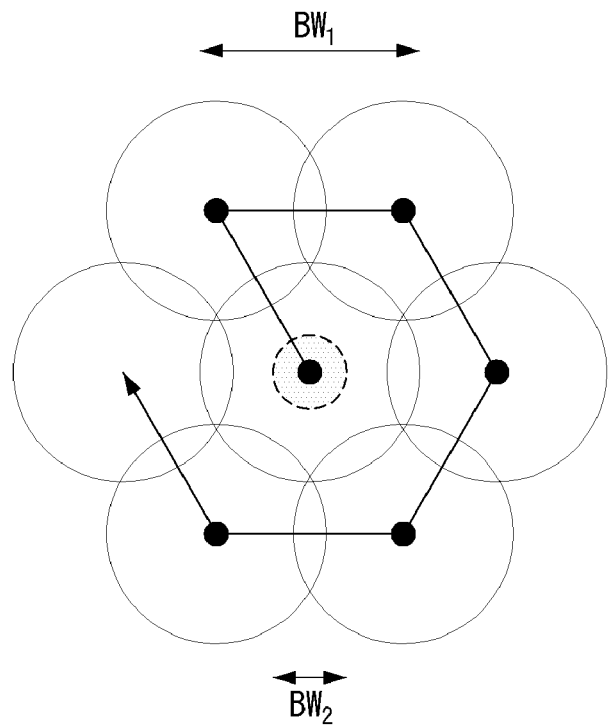
FIG. 15 is a conceptual diagram illustrating a third exemplary embodiment of a backhaul link management method in a mobile backhaul system.

FIG. 15 is a conceptual diagram illustrating a third exemplary embodiment of a backhaul link management method in a mobile backhaul system.

Referring to FIG. 15, the mobile backhaul hub may periodically calculate the separation distance between the mobile backhaul hub and the mobile backhaul terminal for backhaul link management. In response to determining that the beam area to which the mobile backhaul terminal belongs has been changed from $R_1$ to $R_2$ as a result of calculating the separation distance, if the signal strength $B_{pow}$ of the beam received from the mobile backhaul terminal is less than a lower threshold $TH_{L1}$ configured in the area $R_1$ (i.e., $B_{pow} < TH_{L1}$), the mobile backhaul hub may perform the beam re-search process using a narrower beam width $BW_2$ than the previously-used beam width $BW_1$.

Figure 16:
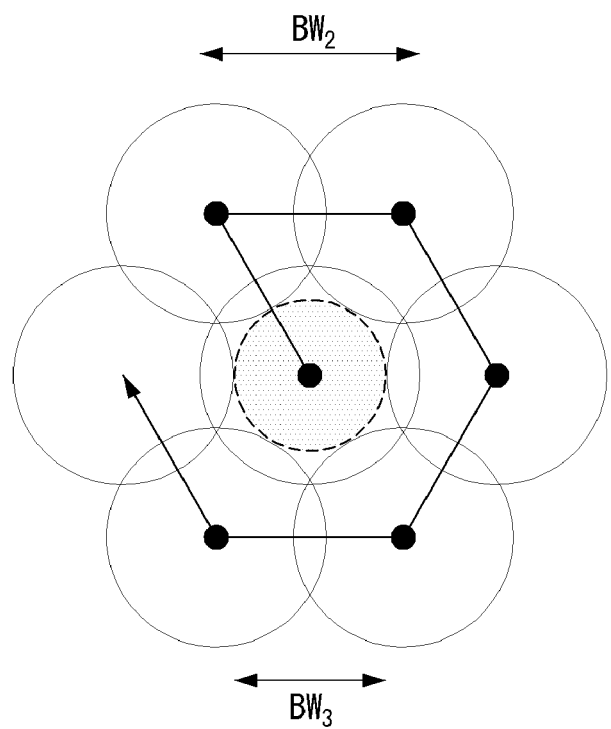
FIG. 16 is a conceptual diagram illustrating a fourth exemplary embodiment of a backhaul link management method in a mobile backhaul system.

FIG. 16 is a conceptual diagram illustrating a fourth exemplary embodiment of a backhaul link management method in a mobile backhaul system.

Referring to FIG. 16, the mobile backhaul hub may periodically calculate the separation distance between the mobile backhaul hub and the mobile backhaul terminal for backhaul link management. In response to determining that the beam area to which the mobile backhaul terminal belongs has been changed from $R_2$ to $R_3$ as a result of calculating the separation distance, if the signal strength $B_{pow}$ of the beam received from the mobile backhaul terminal is less than a lower threshold $TH_{L2}$ configured in the area $R_2$ (i.e., $B_{pow} < TH_{L2}$), the mobile backhaul hub may perform the beam re-search process using a narrower beam width $BW_3$ than the previously-used beam width $BW_2$.

Figure 17:
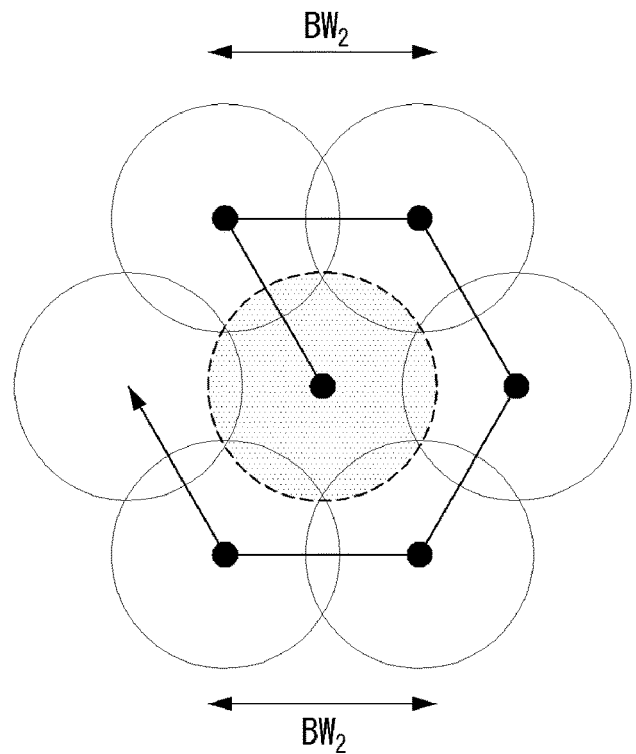
FIG. 17 is a conceptual diagram illustrating a fifth exemplary embodiment of a backhaul link management method in a mobile backhaul system.

FIG. 17 is a conceptual diagram illustrating a fifth exemplary embodiment of a backhaul link management method in a mobile backhaul system.

Referring to FIG. 17, the mobile backhaul hub may periodically calculate the separation distance between the mobile backhaul hub and the mobile backhaul terminal for backhaul link management. In response to determining that the beam area to which the mobile backhaul terminal belongs is not changed as a result of calculating the separation distance, if the signal strength $B_{pow}$ of the beam received from the mobile backhaul terminal is less than a lower threshold $TH_{L2}$ configured in the area $R_2$ (i.e., $B_{pow} < TH_{L2}$), the mobile backhaul hub may perform the beam re-search process without changing the previously-used beam width $BW_2$. In this case, the mobile backhaul hub can perform the beam re-search process for backhaul link management without changing the beam width, considering that the signal is attenuated due to an external factor of the aerial vehicle on which the mobile backhaul terminal is mounted.

Meanwhile, if the aerial vehicle on which the mobile backhaul terminal is mounted hovers after the initial backhaul link between the mobile backhaul hub and the mobile backhaul terminal is established, the mobile backhaul hub may perform the beam re-search process regardless of the beam area ($R_1$, $R_2$, or $R_3$) to which the mobile backhaul terminal belongs. Since the beam fluctuation may not be large when the moving speed of the aerial vehicle equipped with the mobile backhaul terminal is not fast and the position change due to external factors is small, the mobile backhaul hub may perform the beam re-search process for backhaul link management by using the beam, beam width, beam area, azimuth angle, elevation angle and/or number of beams selected in the previous procedure. Hereinafter, the beam re-search process performed by the mobile backhaul hub for backhaul link management when the aerial vehicle equipped with the mobile backhaul terminal hovers will be described.

Figure 18:
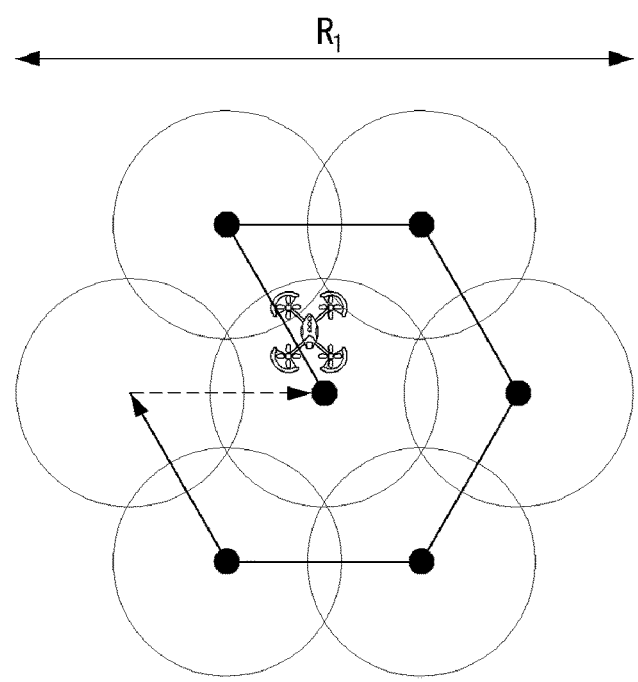
FIG. 18 is a conceptual diagram illustrating a sixth exemplary embodiment of a backhaul link management method in a mobile backhaul system.

FIG. 18 is a conceptual diagram illustrating a sixth exemplary embodiment of a backhaul link management method in a mobile backhaul system.

Referring to FIG. 18, when the aerial vehicle hovers within the beam area $R_1$ after the initial backhaul link is established (i.e., $R_{t1}=R_{t2}=R_1$), the mobile backhaul hub may perform the beam re-search process for backhaul link management based on the beam area $R_1$, beam width $BW_1$, azimuth angle $\theta_{a1}$, elevation angle $\theta_{e1}$, and/or number $N_1$ of beams selected in the previous procedure with the beam selected in the previous initial backhaul link setup and/or management procedure as a center.

Figure 19:
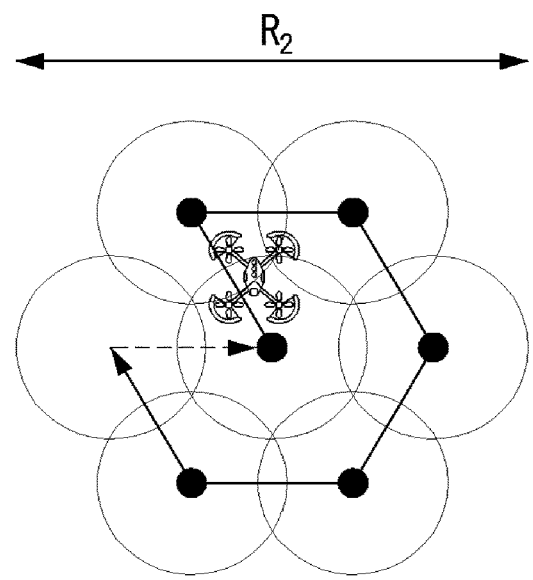
FIG. 19 is a conceptual diagram illustrating a seventh exemplary embodiment of a backhaul link management method in a mobile backhaul system.

FIG. 19 is a conceptual diagram illustrating a seventh exemplary embodiment of a backhaul link management method in a mobile backhaul system.

Referring to FIG. 19, when the aerial vehicle hovers within the beam area $R_2$ after the initial backhaul link is established (i.e., $R_{t1}=R_{t2}=R_2$), the mobile backhaul hub may perform the beam re-search process for backhaul link management based on the beam area $R_2$, beam width $BW_2$, azimuth angle $\theta_{a2}$, elevation angle $\theta_{e2}$, and/or number $N_2$ of beams selected in the previous procedure with the beam selected in the previous initial backhaul link setup and/or management procedure as a center.

Figure 20:
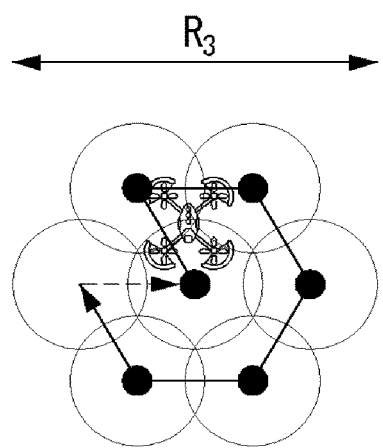
FIG. 20 is a conceptual diagram illustrating an eighth exemplary embodiment of a backhaul link management method in a mobile backhaul system.

FIG. 20 is a conceptual diagram illustrating an eighth exemplary embodiment of a backhaul link management method in a mobile backhaul system.

Referring to FIG. 20, when the aerial vehicle hovers within the beam area $R_3$ after the initial backhaul link is established (i.e., $R_{t1}=R_{t2}=R_3$), the mobile backhaul hub may perform the beam re-search process for backhaul link management based on the beam area $R_3$, beam width $BW_3$, azimuth angle $\theta_{a3}$, elevation angle $\theta_{e3}$, and/or number $N_3$ of beams selected in the previous procedure with the beam selected in the previous initial backhaul link setup and/or management procedure as a center. That is, since the beam fluctuation may not be large when the communication environmental change due to moving of the aerial vehicle on which the mobile backhaul terminal is mounted and/or atmospheric attenuation or rainfall attenuation is not large, the mobile backhaul hub may perform, for power consumption reduction and/or efficient beam search, the beam re-search process for backhaul link management regardless of the area to which the mobile backhaul terminal belongs.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the exemplary embodiments of the present disclosure and their advantages have been described in detail, it should be understood that various changes, substitutions and alterations may be made herein without departing from the scope of the present disclosure.

What is claimed is:

1. A method for managing a mobile backhaul link, performed by a hub in a mobile backhaul system, the method comprising:
   calculating a first separation distance between the hub and a mobile backhaul terminal using first global positioning system (GPS) position information at a first time, and calculating a second separation distance between the hub and the mobile backhaul terminal using second GPS position information at a second time;
   determining whether a first beam area to which the mobile backhaul terminal belongs according to the first separation distance matches a second beam area to which the mobile backhaul terminal belongs according to the second separation distance;
   in response to determining that the first beam area matches the second beam area, comparing a strength of a signal received from the mobile backhaul terminal with a first lower threshold value;
   in response to determining that the strength of the signal is less than the first lower threshold value, determining whether a beam width of a first beam used for the mobile backhaul link matches a beam width determined for the first beam area; and
   in response to determining that the beam width of the first beam does not match a beam width determined for a beam area to which the mobile backhaul terminal belongs, selecting the beam width of the first beam as a beam width matching a beam width determined for a beam area to which the mobile backhaul terminal belongs.

2. The method according to claim 1, further comprising: in response to determining that the beam width of the first beam matches a beam width determined for the beam area to which the mobile backhaul terminal belongs, selecting a second beam having a largest signal strength by performing a beam search process of measuring one or more signal strengths of at least one beam with the first beam as a center, wherein the second beam is used for managing the mobile backhaul link.

3. The method according to claim 1, wherein when the beam width of the first beam does not match a beam width determined for the beam area to which the mobile backhaul terminal belongs, the first lower threshold value is changed to a second lower threshold value, and the second lower threshold value is smaller than the first lower threshold value.

4. The method according to claim 1, further comprising:
   in response to determining that the first beam area does not match the second beam area, comparing a received signal strength of the first beam with the first lower threshold value; and
   in response to determining that the received signal strength is less than the first lower threshold value, changing the beam width of the first beam, wherein the beam width of the first beam after the change is narrower than the beam width of the first beam before the change.

5. The method according to claim 4, further comprising: selecting a second beam having a largest signal strength by performing a beam search process of measuring one or more signal strengths of at least one beam with the first beam whose beam width has been changed as a center, wherein the second beam is used for managing the mobile backhaul link.

6. The method according to claim 4, further comprising:
in response to determining that the received signal strength is equal to or greater than the first lower threshold value, comparing the received signal strength with a first upper threshold value; and
in response to determining that the received signal strength is equal to or greater than the first upper threshold value, changing the beam width of the first beam,
wherein the beam width of the first beam after the change is wider than the beam width of the first beam before the change.

7. The method according to claim 6, wherein when the received signal strength is equal to or greater than the first upper threshold value, the first upper threshold value is changed to a second upper threshold value, and the second upper threshold value is greater than the first upper threshold value.

8. The method according to claim 6, further comprising:
in response to determining that the received signal strength is less than the first upper threshold value, receiving third GPS position information of the hub and the mobile backhaul terminal at a third time; and
calculating a third separation distance between the hub and the mobile backhaul terminal using the third GPS position information.

* * * * *